United States Patent
Kawashima et al.

(10) Patent No.: US 8,166,322 B2
(45) Date of Patent: Apr. 24, 2012

(54) PORTABLE TERMINAL DEVICE

(75) Inventors: Shinichi Kawashima, Kawasaki (JP); Go Hitaka, Kawasaki (JP); Hideharu Tateshima, Minato-ku (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 396 days.

(21) Appl. No.: 12/404,599

(22) Filed: Mar. 16, 2009

(65) Prior Publication Data

US 2010/0037080 A1 Feb. 11, 2010

(30) Foreign Application Priority Data

Aug. 5, 2008 (JP) ................ P2008-202429

(51) Int. Cl.
*G06F 1/00* (2006.01)
*G06F 1/26* (2006.01)
*H03B 19/00* (2006.01)
*H03J 7/04* (2006.01)
*H03C 3/00* (2006.01)
*H04M 1/00* (2006.01)

(52) U.S. Cl. ......... 713/322; 713/320; 327/113; 331/1 R; 332/117; 455/574

(58) Field of Classification Search ............... 713/320, 713/322; 327/113; 331/1 R; 332/117; 455/574
See application file for complete search history.

(56) References Cited

U.S. PATENT DOCUMENTS

| 6,076,171 | A  | * | 6/2000  | Kawata       | 713/501 |
| 6,230,279 | B1 | * | 5/2001  | Dewa et al.  | 713/324 |
| 6,820,209 | B1 | * | 11/2004 | Culbert et al. | 713/501 |
| 6,836,848 | B2 | * | 12/2004 | Yu et al.    | 713/300 |
| 7,131,016 | B2 | * | 10/2006 | Oh et al.    | 713/322 |
| 2007/0168686 | A1 | * | 7/2007 | Pessolano   | 713/500 |

FOREIGN PATENT DOCUMENTS

JP 2008-077563 A 4/2008

* cited by examiner

*Primary Examiner* — Stefan Stoynov

(74) *Attorney, Agent, or Firm* — Maschoff Gilmore & Israelsen

(57) ABSTRACT

A portable terminal device includes a supplying unit for supplying, to a CPR, an operating frequency of a clock signal used to operate the CPU, a setting unit for setting one clock level out of a plurality of clock levels assigned with the operating frequency in accordance with an operating state of the CPU and changing an operating frequency stepwise at the clock levels to set the clock level of the operating frequency, a control unit for controlling the operating frequency supplied to the CPU at the clock levels based on settings made by the setting unit, and an input accepting unit for accepting a key input. If the input accepting unit accepts the key input, the setting unit sets the clock level to a predetermined level irrespective of an operating state of the CPU.

7 Claims, 14 Drawing Sheets

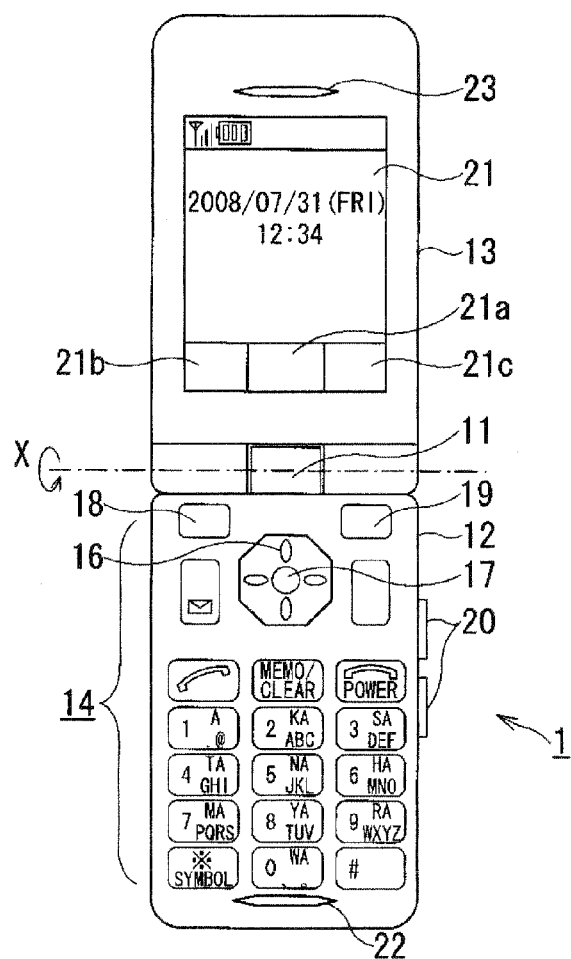
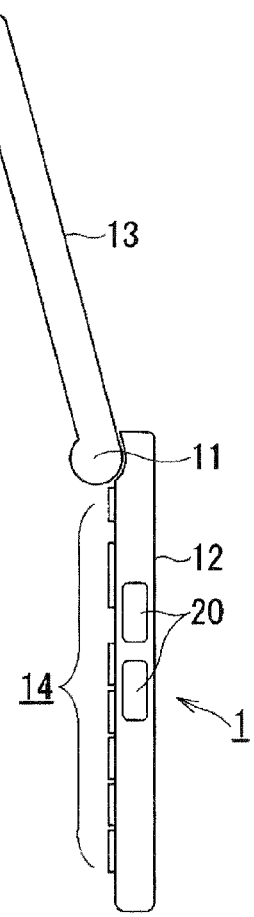
FIG. 1A    FIG. 1B
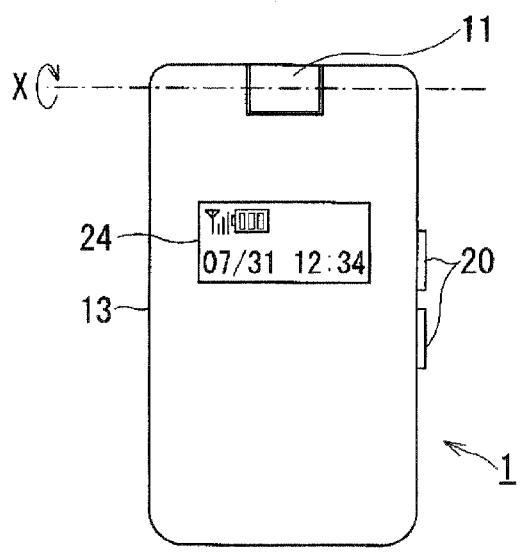
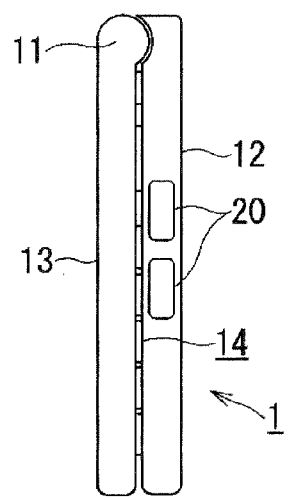
FIG. 2A    FIG. 2B

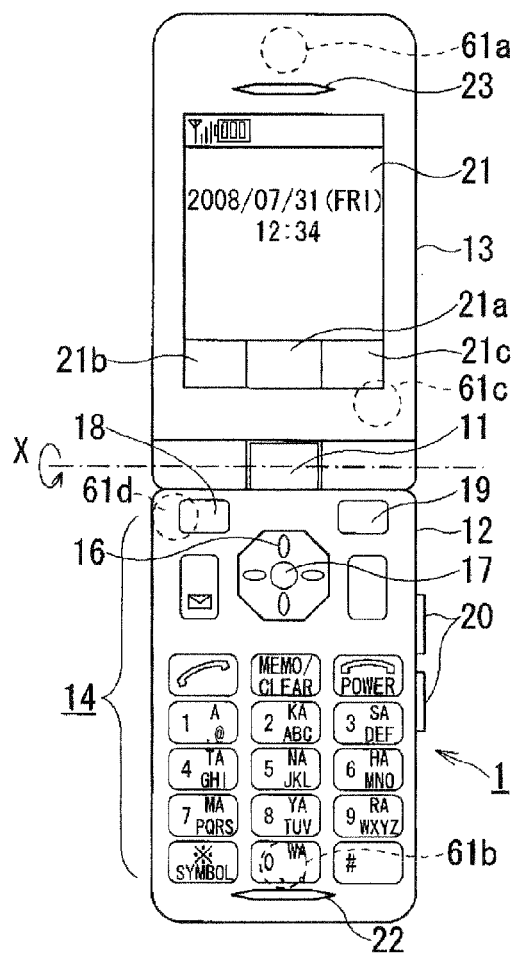
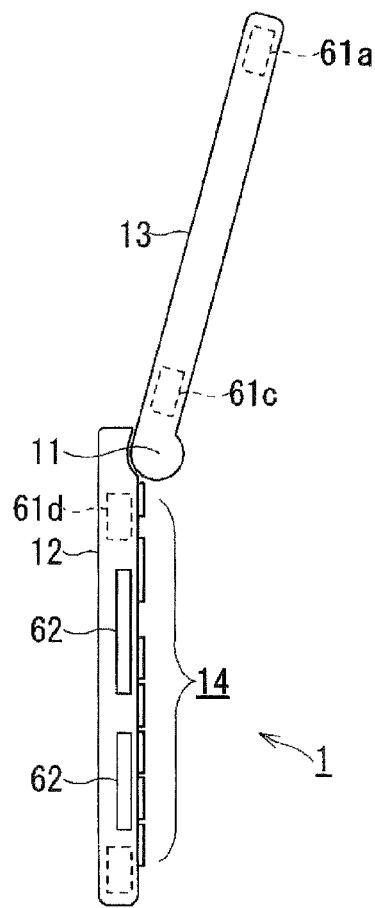
FIG. 11A    FIG. 11B
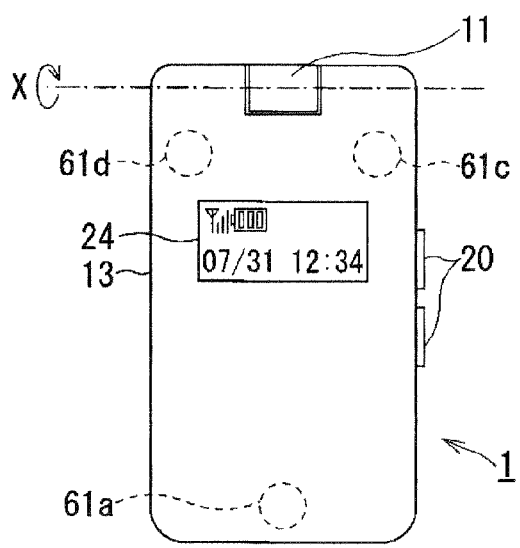
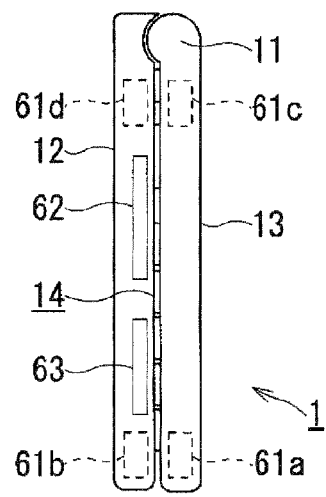
FIG. 12A    FIG. 12B

| TIME | OLDEST | | | | | | | LATEST | UTILIZATION (BUSY STATE RATIO) | CLOCK LEVEL |
|---|---|---|---|---|---|---|---|---|---|---|
| t 1 | ○ | ○ | ○ | ○ | ○ | ○ | ○ | ○ | 0/8 | 1 (EXECUTION OF SLEEP TASK) |
| t 2 | ○ | ○ | ○ | ○ | ○ | ○ | ○ | ● | 1/8 | 1→2 |
| t 3 | ○ | ○ | ○ | ○ | ○ | ○ | ● | ● | 2/8 | 2 |
| t 4 | ○ | ○ | ○ | ○ | ○ | ● | ● | ● | 3/8 | 2→3 |
| t 5 | ○ | ○ | ○ | ○ | ● | ● | ● | ● | 4/8 | 3 |
| t 6 | ○ | ○ | ○ | ● | ● | ● | ● | ● | 5/8 | 3→4 |
| t 7 | ○ | ○ | ● | ● | ● | ● | ● | ● | 6/8 | 4 |
| t 8 | ○ | ● | ● | ● | ● | ● | ● | ● | 7/8 | 4→5 |
| t 9 | ● | ● | ● | ● | ● | ● | ● | ● | 8/8 | 5 (MAXIMUM CLOCK LEVEL) |
| t 10 | ● | ● | ● | ● | ● | ● | ● | ○ | 7/8 | 5 |
| t 11 | ● | ● | ● | ● | ● | ● | ○ | ○ | 6/8 | 5→4 |
| t 12 | ● | ● | ● | ● | ● | ○ | ○ | ○ | 5/8 | 4 |
| t 13 | ● | ● | ● | ● | ○ | ○ | ○ | ○ | 4/8 | 4→3 |
| t 14 | ● | ● | ● | ○ | ○ | ○ | ○ | ○ | 3/8 | 3 |
| t 15 | ● | ● | ○ | ○ | ○ | ○ | ○ | ○ | 2/8 | 3→2 |
| t 16 | ● | ○ | ○ | ○ | ○ | ○ | ○ | ○ | 1/8 | 2 |
| t 17 | ○ | ○ | ○ | ○ | ○ | ○ | ○ | ○ | 0/8 | 2→1 |

○ : SLEEP STATE
● : BUSY STATE

FIG. 16

PORTABLE TERMINAL DEVICE

BACKGROUND OF THE INVENTION

1. Field of the Invention

The present invention relates to a portable terminal device and more specifically to a portable terminal device designed to appropriately control an operating frequency of a CPU.

2. Related Art

In recent years, portable terminal devices driven with an internal battery, which are typified by a cellular phone, have been often used away from home or in the motion. In addition, the portable terminal devices are equipped with a function of reproducing video data or music data and a function of viewing/recording one-segment broadcasting data as well as a voice communication function and an e-mail function to enhance their functions.

Along with such a tendency toward an enhanced portable terminal device, a high performance is required of a processor. However, the high-performance processor consumes a lot of power, resulting in a problem of shortening an internal battery life.

To overcome such problem, one known electronic device controls an operating frequency of a CPU and a power supply voltage in a simple manner to enable a power-saving effect (see Japanese Unexamined Patent Application Publication No. 2008-77563 (Patent Publication 1), for instance).

A technique of controlling an operating frequency of a CPU disclosed in the Patent Publication determines an operating frequency according to CPU utilization and thus can appropriately reduce power consumption by suppressing unintended increase of an operating frequency.

However, this technique provides a problem that the determined operating frequency might lead to an insufficient throughput for some processing executed on the CPU and cause user's dissatisfaction at responsiveness and operability of the entire portable terminal device.

SUMMARY OF THE INVENTION

The present invention has been accomplished in view of the circumstances encountered in the prior art mentioned above, and an object of the present invention is to provide a portable terminal device designed to appropriately control an operating frequency of a CPU according to executed processing to thereby realize reduction in power consumption and efficient execution of CPU processing according to the circumstances.

The above and other objects can be achieved according to the present invention by providing, in one aspect, a portable terminal device comprising:

a CPU;

a supplying unit configured to supply, to the CPU, an operating frequency of a clock signal used to operate the CPU;

a setting unit configured to set one cock level out of a plurality of clock levels assigned with the operating frequency in accordance with an operating state of the CPU and to change the operating frequency stepwise at the clock levels to set the clock level of the operating frequency;

a control unit configured to control the operating frequency supplied to the CPU at the clock levels based on the setting made by the setting unit; and an input accepting unit configured to accept a key input, wherein if the input accepting unit accepts the key input, the setting unit sets the clock level to a predetermined level irrespective of an operating state of the CPU.

In a preferred embodiment of this aspect, it may be desired that when the input accepting unit accepts the key input, the setting unit sets the clock level to the clock level assigned with the maximum value of the operating frequency.

In another aspect of the present invention, there is also provided a portable terminal device comprising:

a CPU;

a supplying unit configured to supply, to the CPU, an operating frequency of a clock signal used to operate the CPU;

a setting unit configured to set one cock level out of a plurality of clock levels assigned with the operating frequency in accordance with an operating state of the CPU and change the operating frequency stepwise at the clock levels to set the clock level of the operating frequency;

a control unit configured to control the operating frequency supplied to the CPU at the clock levels based on the setting made by the setting unit; and a detecting unit configured to detect a predetermined processing executed by a user, wherein if the detecting unit detects the processing, the setting unit sets the clock level to a predetermined level irrespective of an operating state of the CPU.

In a preferred embodiment of this aspect, it may be desired that if the detecting unit detects the processing, the setting unit sets the clock level to the clock level assigned with the maximum value of the operating frequency. The predetermined processing executed by a user may include at least key press, change of a casing, insertion of a cable and insertion of a memory card.

It may be also desired that, in both the above aspects, the portable terminal device may further include a utilization acquisition unit configured to acquire utilization of the CPU indicating an operating state of the CPU, wherein the setting unit increases or decreases the clock level stepwise along with an increase or decrease of the utilization.

According to the portable terminal device of the present invention of the characters mentioned above, it becomes possible to appropriately control the operating frequency of the CPU by the executed processing to thereby realize the reduction in power consumption and the efficient execution of CPU processing according to the circumstances.

The nature and further characteristic features of the present invention will be made clearer from the following descriptions made with reference to the accompanying drawings.

BRIEF DESCRIPTION OF THE DRAWINGS

In the accompanying drawings:

FIGS. 1A and 1B show an external configuration of a cellular phone devised as a first embodiment of a portable terminal device in an opened state according to the present invention;

FIGS. 2A and 2B show an external configuration of a cellular phone devised as the first embodiment of the portable terminal device in a closed state according to the present invention;

FIGS. 8A to 8D illustrate the case of performing operating frequency setting processing in processing A and processing B that are unsuccessively executed, in which FIG. 8A is a graph showing a way how a clock level is shifted, FIG. 8B shows a relationship between an execution time of the processing A and an execution time of the processing B in the case where the operating frequency setting processing of FIG. 8A is carried out, FIG. 8C is a graph showing a way how a clock level is shifted in the case where operating frequency setting processing is carried out, as a comparative example to the operating frequency setting processing of FIG. 8A, and FIG. 8D shows a relationship between an execution time of the processing A and an execution time of the processing B in the case where the operating frequency setting processing of FIG. 8C is carried out;

FIGS. 9A to 9D illustrate the case of performing the operating frequency setting processing in the processing A and processing B that are successively executed, in which FIG. 9A is a graph showing a way how a clock level is shifted, FIG. 9B shows a relationship between an execution time of the processing A and an execution time of the processing B in the case where the operating frequency setting processing of FIG. 9A is carried out, FIG. 9C is a graph showing a way how, a clock level is shifted in the case where operating frequency setting processing is carried out, as a comparative example to the operating frequency setting processing of FIG. 9A, and FIG. 9D shows a relationship between an execution time of the processing A and an execution time of the processing B in the case where the operating frequency setting processing of FIG. 9C is carried out;

FIGS. 10A to 10D illustrate another case of performing the operating frequency setting processing in processing A and processing B that are successively executed, in which FIG. 10A is a graph showing a way how a clock level is shifted, FIG. 10B shows a relationship between an execution time of the processing A and an execution time of the processing B in the case where the operating frequency setting processing of FIG. 10A is carried out, FIG. 10C is a graph showing a way how a clock level is shifted in the case where the operating frequency setting processing is carried out, as a comparative example to the operating frequency setting processing of FIG. 10A, and FIG. 10D shows a relationship between an execution time of the processing A and an execution time of the processing B in the case where the operating frequency setting processing of FIG. 10C is carried out;

FIGS. 11A and 11B show an external configuration of a cellular phone devised as a second embodiment of a portable terminal device according to the present invention;

FIGS. 12A and 12B show another external configuration of the cellular phone devised as the second embodiment of the portable terminal device according to the present invention;

FIG. 16 is a conceptual view illustrating an example of the clock level setting processing executed by an operating frequency setting unit.

DESCRIPTION OF THE PREFERRED EMBODIMENTS

First Embodiment

Figure 3:
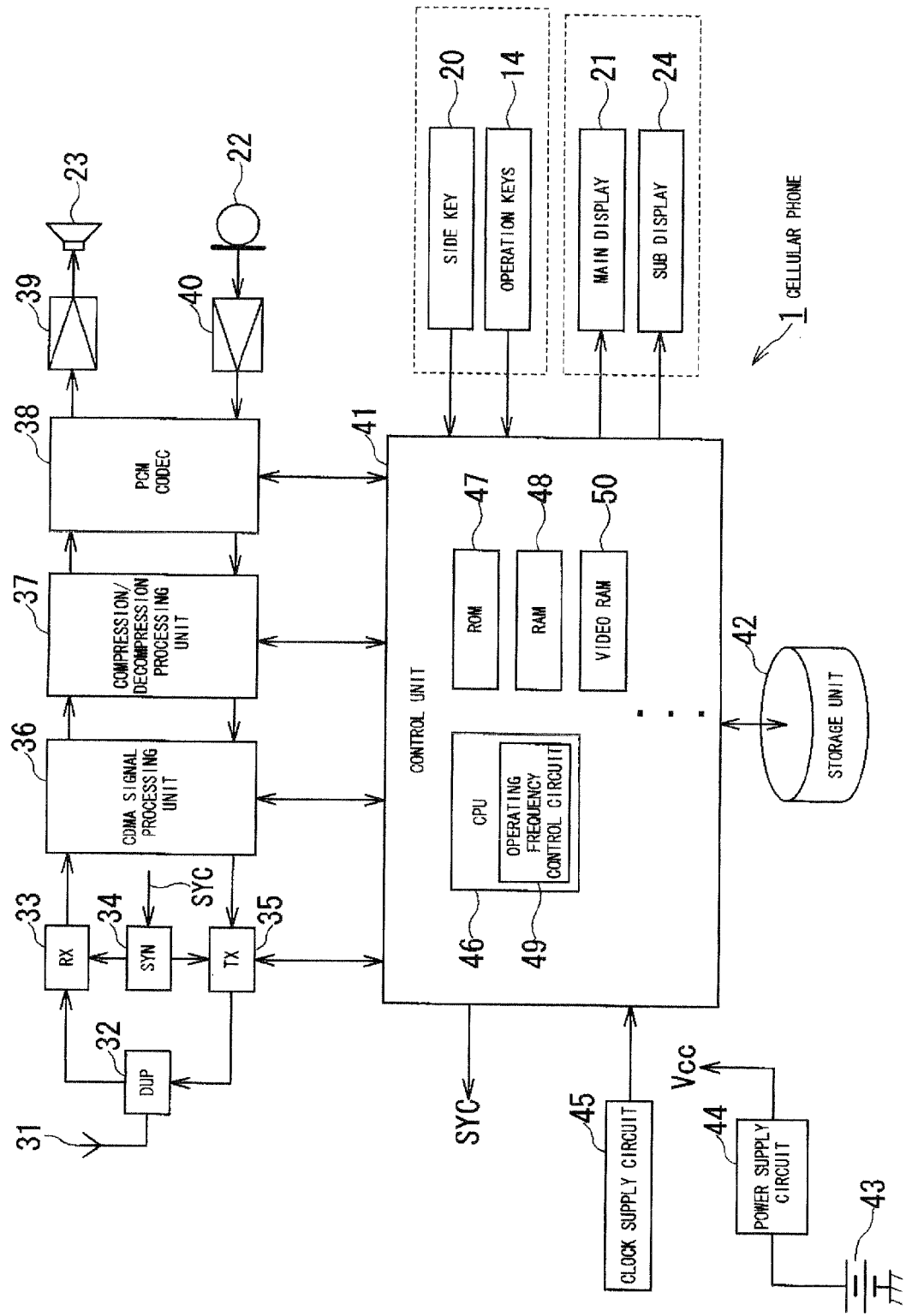
FIG. 3 shows an internal arrangement of the cellular phone of the first embodiment.

A first embodiment of a portable terminal device according to the present invention will be described with reference to the accompanying drawings.

First, with reference to FIGS. 1A and 1B, the cellular phone 1 is configured such that a first casing 12 and a second casing 13 are hinge-coupled with each other across a central hinge portion 11. The cellular phone 1 can be folded at the hinge portion 11 in the direction of the arrow X in FIG. 1A. A transmitting antenna (antenna 31 described later with reference to FIG. 3) is provided in a predetermined position in the cellular phone 1, and radio waves are received or transmitted from or to a base station through the internal antenna.

On the surface of the first casing 12, operation keys 14 including numeric keys "0" to "9", a call/answer key, an end/power key, a clear key, and a menu key are arranged. Various instructions can be input by use of the operation keys 14.

In an upper portion of the first casing 12, an arrow key 16 and an enter key 17 are provided as the operation keys 14. The arrow key 16 includes an upward key, a downward key, a rightward key and a leftward key. A user can move a cursor displayed on a main display 21, for example, by pressing an upper portion, a lower portion, a right portion or a left portion of the answer key 16. Further, various functions can be selected and confirmed by pressing the enter key 17. The enter key 17 is also assigned with processing displayed in an enter key function display portion 21a in a lower portion of the main display 21.

Further, on the first casing 12, a left softkey 18 and a right softkey 19 are arranged on the arrow key 16 and the enter key 17, respectively. The left softkey 18, the right softkey 19, and a side key 20 are pressed toward the inside of the first casing 12 to execute assigned predetermined processing. In particular, the left softkey 18 and the right softkey 19 are assigned with the processing displayed in a left softkey function display portion 21b and a right softkey function display portion 21c in a lower portion of the main display 21.

A microphone 22 is provided below the operation keys 14 in the first casing 12. The microphone 22 collects user's voice during a voice call.

The first casing 12 has a battery pack inserted to the back thereof. When the end/power key is pressed to power the cellular phone on, a power is supplied from the battery back to each circuit units to set the cellular phone operable.

On the other hand, the second casing 13 has the main display 21 provided on the front thereof. Not only reception and a battery power but also an e-mail notification or a simplified web page can be displayed thereon. Here, the main display 21 is configured to use, for example, an LCD (Liquid Crystal Display) display, an organic EL (Electro Luminescence) display, or an inorganic EL display.

Further, a receiver 23 is provided in a predetermined position in an upper portion of the main display 21. A user can make a voice call using the receiver. A speaker, not shown, is also provided in a predetermined position of the cellular phone 1 as a voice output unit in addition to the receiver 23. A voice of a person on the other end of the phone is output from the speaker during video phone call.

FIGS. 2A and 2B show another external configuration of the cellular phone 1 devised as the first embodiment of the portable terminal device according to the present invention. In the illustrated examples of FIGS. 2A and 2B, the opened cellular phone 1 in FIGS. 1A and 1B is turned in the direction of the arrow X and then closed. FIG. 2A shows the external configuration of the closed cellular phone 1 as viewed from the front, and FIG. 2B shows the external configuration of the closed cellular phone 1 as viewed from the right side.

The second casing 13 is provided with a sub display 24 using, for example, an LCD. An antenna pictograph indicating a current sensitivity level of an antenna, a battery pictograph indicating a current battery power of the cellular phone 1, and a current time are displayed thereon.

FIG. 3 shows an internal arrangement of the cellular phone 1 of the first embodiment. A radio signal transmitted from a base station, not shown, is input to an antenna 31 and then input to a receiving circuit (RX) 33 through an antenna duplexer (DUP) 32. The receiving circuit 33 mixes the received radio signal with a local-generated signal output from a frequency synthesizer (SYN) 34 to frequency-convert (down-convert) the mixed signal to an intermediate frequency signal. Then, the receiving circuit 33 subjects the down-converted intermediate frequency signal to orthogonal demodulation and outputs a reception baseband signal.

The reception baseband signal from the receiving circuit 33 is input to a CDMA (Code Division Multiple Access) signal processing unit 36. The CDMA signal processing unit 36 is provided with a RAKE receiver, not shown. In the RAKED receiver, plural paths in the reception baseband signal are despread with a corresponding spread code (in other words, the same spread code as a spread code of the spread reception signal). Then, signals of the despread paths are arbitrated in phase and then subjected to coherent Rake synthesis. The Rake-synthesized data sequence is subjected to deinterleaving and channel decoding (error-correction decoding) and then to binary data determination. As a result, reception packet data of a predetermined transmission format is obtained. This reception packet data is input to a compression/decompression processing unit 37.

The compression/decompression processing unit 37 includes a DSP (Digital Signal Processor) and the like and separates the reception packet data output from the CDMA signal processing unit 36 into media with a multiple separation unit, not shown, to decode the separated media.

A digital video signal decoded with a video codec in the compression/decompression processing unit 37 is input to a control unit 41. The control unit 41 displays moving images corresponding to the video signal output from the compression/decompression processing unit 37 on the main display 21 through a not-shown video RAM (for example, VRAM or the like).

On the other hand, an audio signal (analog audio signal) of a speaker (user) input to the microphone 22 is amplified to an appropriate level by a transmission voice amplifier 40 and then PCM-coded with a PCM codec 38. The PCM-coded digital audio signal is input to the compression/decompression processing unit 37. Further, an e-mail or other such text data generated with the control unit 41 is also input to the compression/decompression processing unit 37.

The compression/decompression processing unit 37 compression-codes the digital audio signal output from the PCM codec 38 in accordance with a format conforming to a predetermined transmission data rate. As a result, audio data is generated. Furthers the compression/decompression processing unit 37 compression-codes the digital video signal output from the control unit 41 to generate video data. Then, the compression/decompression processing unit 37 multiplexes the audio data and the video data with a multiple separation unit, not shown, in accordance with a predetermined transmission format and then packetizes the data to output the thus-packetized transmission packet data to the CDMA signal processing unit 36.

The CDMA signal processing unit 36 spectrum-spreads the transmission packet data output from the compression/decompression processing unit 37 using a spread code assigned to a transmission channel and sends the spectrum-spread output signal to a transmitting circuit (TX) 35. The transmitting circuit 35 modulates the spectrum-spread signal based on a digital modulation method such as a QPSK (Quadrature Phase Shift Keying) method. The transmitting circuit 35 synthesizes the digital-modulated transmission signal with the local-generated signal from the frequency synthesizer 34 to frequency-convert (up-convert) the composite signal to a radio signal. After that, the transmitting circuit 35 amplifies the up-converted radio signal to a high frequency to realize a transmission power level instructed by the control unit 41. The high-frequency amplified radio signal is supplied to the antenna 31 through the antenna duplexer 32 and then transmitted from the antenna 31 toward a base station, not shown.

A power supply circuit 44 generates a predetermined operation power supply voltage Vcc based on an output power of a battery 43 to apply the voltage to each circuit unit.

A clock supply circuit 45 generates a clock signal of a predetermined frequency to supply the signal to each circuit of the cellular phone 1.

The control unit 41 includes a CPU 46, a ROM 47 and a RAM 48. The CPU 46 executes various kinds of processing based on programs stored in the ROM 47 or various application programs loaded to the RAM 48 as well as generates various control signals and supplies the generated signals to each unit to execute control over the cellular phone 1.

The CPU 46 is equipped with an operating frequency control circuit 49 for controlling an operating frequency of a clock signal that triggers an operation of the CPU 46. The operating frequency control circuit 49 controls a clock signal supplied from the clock supply circuit 45 to generate a clock signal of a predetermined operating frequency to supply the generated signal into the CPU 46. The operating frequency control circuit 49 can control an operating frequency at plural levels (clock levels), each of which is assigned with a predetermined operating frequency value. The operating frequency control circuit 49 controls an operating frequency based on clock levels preset by an operation frequency setting unit as described below.

The RAM 48 stores data necessary for executing various kinds of processing on the CPU 46. Further, the control unit 41 is equipped with a video RAM 50 that temporarily stores information about moving images displayed on the main display 21.

A storage unit 42 includes, for example, a flash memory element as an electrically-rewritable/erasable non-volatile memory and an HDD (Hard Disc Drive), and stores various application programs executed on the CPU of the control unit 41 or various data groups.

Here, the cellular phone 1 of this embodiment can dynamically control an operating frequency of the CPU 46 of the control unit 41. Hereinafter, a way of controlling an operating frequency of the CPU 46 will be described in detail.

Figure 4:
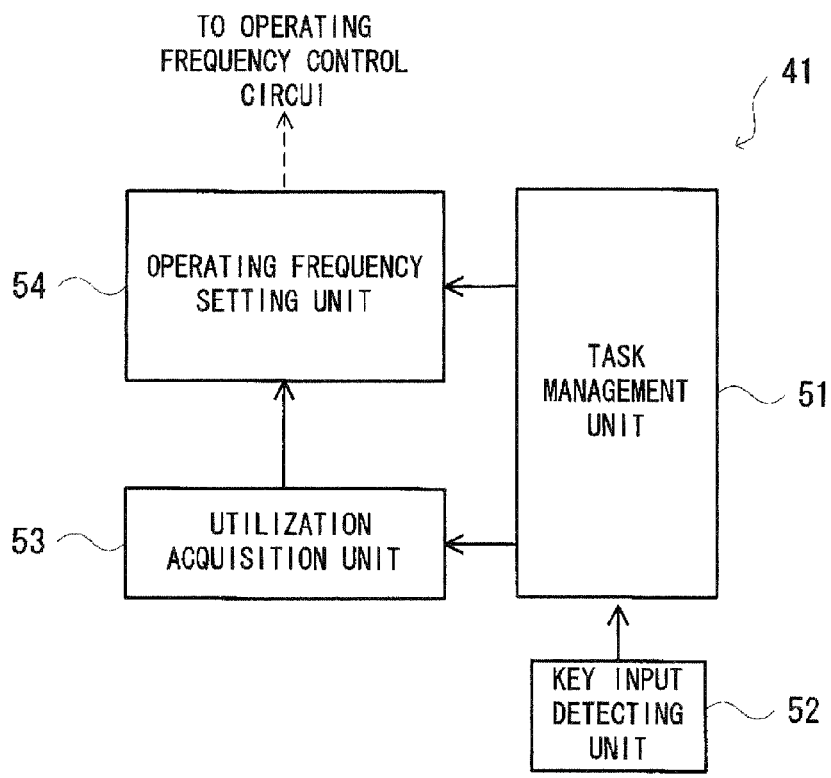
FIG. 4 is a schematic functional block diagram of a control unit of the cellular phone of the first embodiment.

FIG. 4 is a schematic functional block diagram of the control unit 41 of the cellular phone 1 according to the first embodiment. A task management unit 51 manages tasks (processing) to be executed on the CPU 46. The tasks managed with the task management unit 51 are roughly divided into a group of a processing accompanying the event of key input and a group of a processing accompanying the press of the operation key 14 or the side key 20. The processing not accompanying the event of key input is interrupt a processing caused by any other factor than the press of the operation key 14. Examples thereof include a processing for receiving a voice/video phone call, a processing for receiving an e-mail, and a processing that causes an alarm to sound at the preset time.

The tasks managed with the task management unit 51 are prioritized. For example, in consideration of one task which is being executed, if an interruption of another task given a higher priority than the executed one occurs, the task management unit 51 prompts the CPU 46 to execute the higher-priority task first.

The task management unit 51 manages a sleep task that is the lowest-priority special one, as a task ready to execute all the time. A state in which the sleep task is executed refers to a sleep state where no other tasks are being executed or ready to execute.

A key input detecting unit 52 detects the event of key input accompanying the press of the operation key 14 or the side key 20. If detecting the event of key input, the key input detecting unit 52 notifies the task management unit 51 of the detected event. Further, the task management unit 51 manages processing accompanying the event of key input as a task.

A utilization acquisition unit 53 acquires the utilization of the CPU 46 and supplies information about the utilization to the operating frequency setting unit 54. The utilization acquisition unit 53 references a task managed in the task management unit 51 to load the utilization of the CPU 46, for example. The "CPU utilization" can be determined based on a ratio at which any task other than the sleep task occupies the CPU 46 per unit time (or based on a ratio at which the sleep task occupies the CPU 46).

The operating frequency setting unit 54 sets an operation frequency (clock level) to be controlled with the operating frequency control circuit 49 of the CPU 46 in FIG. 3. The clock level set by the operating frequency setting unit 54 is notified to the operating frequency control circuit 49, and the operating frequency control circuit 49 controls the operating frequency.

To be specific, if the utilization acquisition unit 53 loads the utilization not lower than a preset predetermined threshold value a predetermined number of times successively in a row, the operating frequency setting unit 54 raises the clock level by one. The reason therefor is as follows. Under such a situation that the utilization acquisition unit 53 loads the utilization not lower than a preset predetermined threshold value a predetermined number of times in a row, the CPU 46 is executing any task, and it could be considered that the CPU 46 needs to operate at a high operating frequency to increase a throughput. Further, if the utilization acquisition unit 53 loads the utilization not higher than a preset predetermined threshold value a predetermined number of times in a row, the operating frequency setting unit 54 lowers the clock level by one. The reason therefor is as follows. Under a situation that the utilization acquisition unit 53 loads the utilization not higher than a preset predetermined threshold value a predetermined number of times in a row, the CPU 46 is not executing processing of any task, and it could be considered that a power can be saved by operating the CPU 46 at a low operating frequency. To save a power as appropriate, it is desirable that a clock level rarely increases along with a little increase in utilization but changes following a decrease in utilization.

The operating frequency setting unit 54 sets clock levels in the following manner. In the event of any task (i.e., processing) during the operation of the CPU 46 at the lowest clock level, the clock level is increased by one irrespective of the utilization of the CPU 46. In the case where a task is terminated, the clock level is lowered by one.

Parameters (threshold value of utilization and the number of times at which utilization is acquired) for determining whether the clock level is increased or those for determining whether the clock level is decreased may be different from each other or the same.

The operating frequency setting unit 54 of this embodiment is designed to increase an operating frequency of the CPU 46 up to a high operating frequency (clock level) enough to obtain a sufficient throughput if a task occurs following the event of key input in the task management unit 51, regardless of the utilization of the CPU 46. The operating frequency setting unit 54 increases the operating frequency up to a clock level assigned with the maximum operating frequency value, for example.

Further, if another task is being executed when key input is detected, the operating frequency setting unit 54 receives priority information from the task management unit 51. The operating frequency setting unit 54 compares a priority of the task being executed with the task corresponding to the key input and then, only if the priority of the task corresponding to the key input is higher than the other one, the operating frequency is increased to a predetermined clock level.

One example of the processing for setting an operating frequency of the CPU 46 in the cellular phone 1 of this embodiment will be described.

Figure 5:
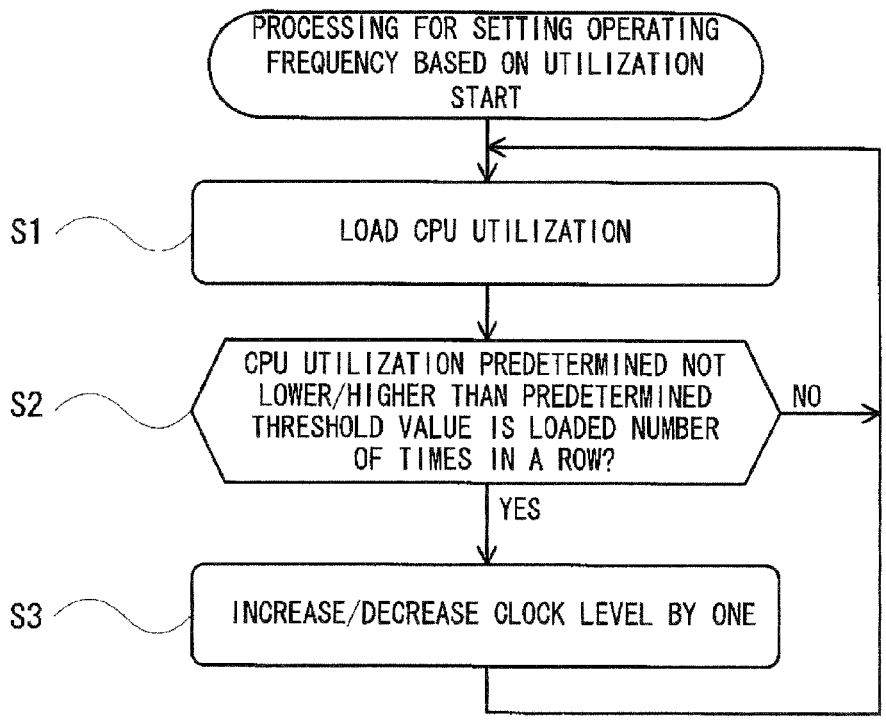
FIG. 5 is a flowchart representing an example of processing for setting a CPU operating frequency based on CPU utilization, which is executed by an operating frequency setting unit of the cellular phone of the first embodiment.

FIG. 5 is a flowchart representing an example of processing for setting a CPU operating frequency based on utilization of the CPU 46, which is executed by the operating frequency setting unit 54 of the cellular phone 1 of the first embodiment.

In step S1, the operating frequency setting unit 54 loads utilization of the CPU 46 with the utilization acquisition unit 53. The operating frequency setting unit 54 obtains values of utilization that were acquired by the utilization acquisition unit 53 at regular time intervals. In this embodiment, the utilization acquisition unit 53 loads utilization every 50 msec and supplies the utilization to the operating frequency setting unit 54 though not limited thereto.

In step S2, the operating frequency setting unit 54 determines whether the utilization acquisition unit 53 acquired utilization not higher/lower than a predetermined threshold value a predetermined number of times (predetermined time) in a row. If determining that the utilization acquisition unit 53 did not load utilization not higher/lower than a predetermined threshold value a predetermined number of times (predetermined time) in a row, the operating frequency setting unit 54 returns to the step S1 as a step of loading the utilization to repeat the processing.

On the other hand, if determining that the utilization acquisition unit 53 acquired utilization not higher/lower than a predetermined threshold value a predetermined number of times (predetermined time) in a row, the operating frequency setting unit 54 increases/decreases a clock level by one in step S3, thus ending the processing for setting an operating frequency based on the utilization of the CPU 46.

Here, the operating frequency setting processing described in this embodiment is executed under the following conditions. That is, the utilization acquisition unit 53 loads the utilization of the CPU 46 every 50 msec and supplies data about the utilization to the operating frequency setting unit 54.

In the case where the utilization acquisition unit 53 loads the utilization not lower than a predetermined threshold value three times in a row (150 msec), the operating frequency setting unit 54 increases a clock level by one. On the other hand, in the case where the utilization acquisition unit 53 loads the utilization not higher than a predetermined threshold value once, the operating frequency setting unit 54 decreases a clock level by one. The above values are given for illustrative purposes, and any other values may be used as long as a power can be saved.

Next, an example of operating frequency setting processing executed in the event of the processing in the cellular phone 1 of this embodiment will be described.

Figure 6:
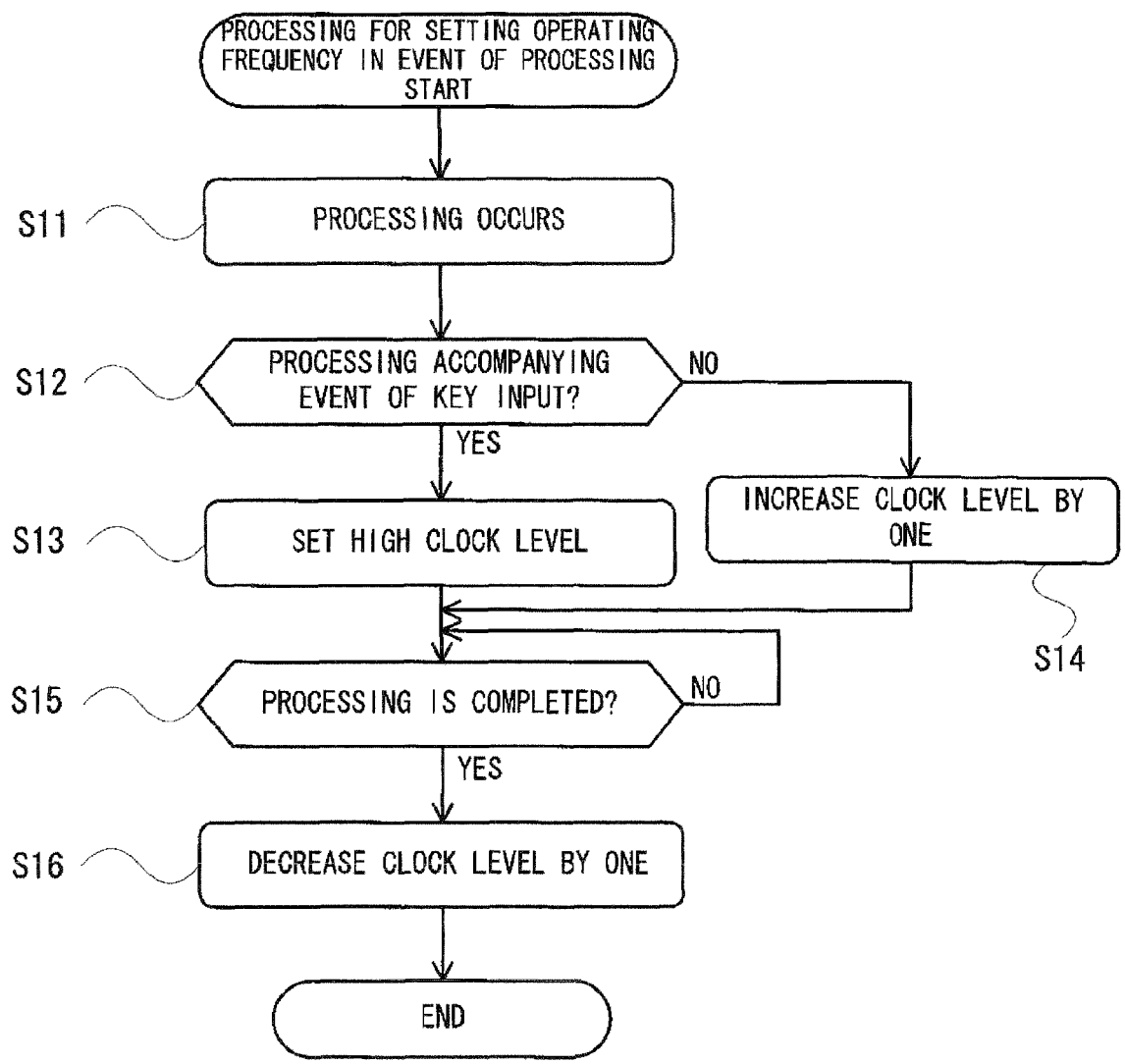
FIG. 6 is a flowchart representing an example of operating frequency setting processing executed by the operating frequency setting unit of the cellular phone of the first embodiment in the event of processing.

FIG. 6 is a flowchart representing an example of operating frequency setting processing executed by the operating frequency setting unit 54 of the cellular phone 1 of the first embodiment in the event of processing. Here, it is assumed that the processing for setting an operating frequency based on the utilization of the CPU 46 as shown in FIG. 5 is being executed during the operating frequency setting processing executed in the event of the processing though not particularly mentioned.

In step S11, any processing occurs in the cellular phone 1. Along with the occurrence, the task management unit 51 collectively manages tasks executed on the CPU 46 of the cellular phone 1, for example.

In step S12, the operating frequency setting unit 54 determines whether the triggered processing is resulted from the event of key input. Here, the processing accompanying the event of key input refers to processing triggered by the press of the operation key 14 or the side key 20. Processing not accompanying the event of key input refers to every processing caused by any other factor than the press of the operation key 14. Examples thereof include a processing for receiving a voice/video phone call, a processing for receiving an e-mail, and a processing that causes an alarm to sound at the preset time.

If determining that the processing accompanied the event of key input, the operating frequency setting unit 54 increases an operating frequency up to a high operating frequency (high clock level) enough to obtain a sufficient throughput regardless of the utilization of the CPU 46, which is notified by the utilization acquisition unit 53, in step S13. In this embodiment) the operating frequency setting unit 54 raises an operating frequency up to a clock level 6 assigned with the maximum operating frequency value.

On the other hand, if determining that the processing did not accompany the event of key input, the operating frequency setting unit 54 increases a clock level by one in step S14.

In step S15, the operating frequency setting unit 54 determines whether the processing that occurred in the processing occurrence step S11 is completed. If determining that the processing continues, the operating frequency setting unit 54 waits until the processing is completed.

On the other hand, if the processing that occurred in step S11 is completed, the operating frequency setting unit 54 executes predetermined processing to lower a clock level by one in step S16. That is all for the description about the operating frequency setting processing executed in the event of processing.

Referring next to a graph, a description will be given to a way how each clock level is shifted when the processing not accompanying the event of key input and the processing accompanying the event of key input occur.

Figure 7A:
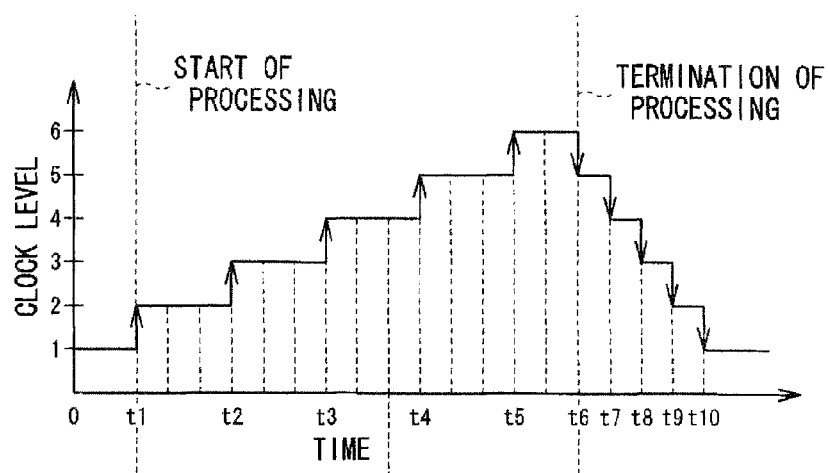
FIG. 7A is a graph representing a shifting state in a clock level in a case where procedure based on non-key input event occurs in a process occur step S11 in an operation frequency setting processing of FIG. 6.
Figure 7B:
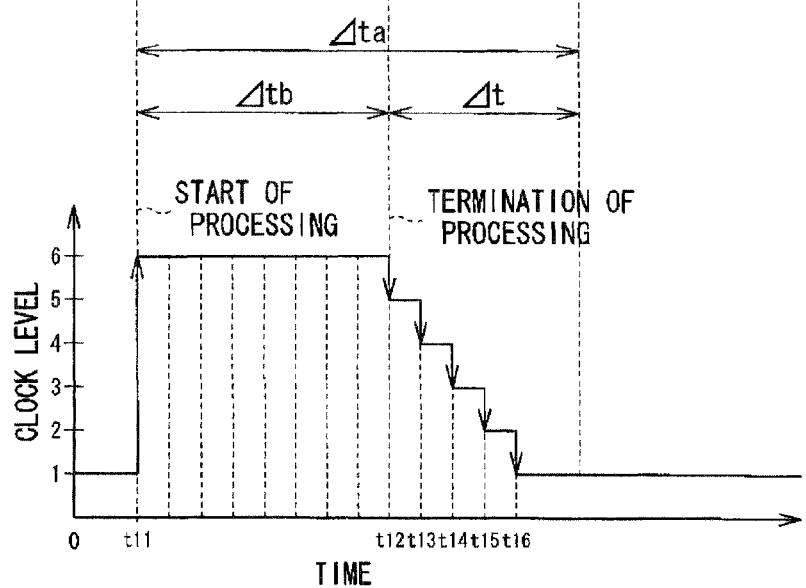
FIG. 7B is a graph representing the shifting state of the clock level in the case where procedure key input event occurs.

FIG. 7A is a graph showing a way how a clock level is shifted in the case where the processing not accompanying the event of key input occurs in as the processing occurrence the step S11 in the operating frequency setting processing in FIG. 6. FIG. 7B is a graph showing a way how a clock level is shifted in the case where processing accompanying the event of key input occurs. Here, the processing not accompanying the event of key input (hereinafter referred to as "processing A") and the processing accompanying the event of key input (hereinafter referred to as "processing B") require almost the same time to execute.

In FIGS. 7A and 7B, the vertical axis represents "clock levels" of a clock signal generated with the operating frequency control circuit 49, and the horizontal axis represents "time" having scales in 50 msec increments. In illustrated examples of FIGS. 7A and 7B, the number of clock levels controllable with the operating frequency control circuit 49 is 6. Further, the processing for setting an operating frequency based on the utilization of the CPU 46 in FIG. 5 is continuously executed by the operating frequency setting unit 54.

During a period from time "0" to processing start time (time t1) in FIG. 7A, a sleep task is executed, and a clock level is set to 1 corresponding to the lowest operating frequency value. Further, the CPU 46 is supplied with a clock signal of a predetermined operating frequency assigned to a clock level 1 under the control of the operating frequency control circuit 49.

At the time t1 (processing start time) in FIG. 7A, the operating frequency setting unit 54 determines that the processing A occurred (processing determination step S12 in FIG. 6) and thus performs the predetermined processing to increase a clock level by one so as to set the clock level to 2 (clock level increasing step S14). Further, the supply of a clock signal of a predetermined operating frequency assigned to a clock level 2 to the CPU 46 is started under the control of the operating frequency control circuit 49.

At time t2, as a result of acquiring utilization of the CPU 46 (utilization acquiring step S1 in FIG. 5), the operating frequency setting unit 54 determines that the utilization not lower than a predetermined threshold value is acquired three times in a row (successive acquisition determination step S2) and thus increases a clock level by one so as to set the clock level to 3 (clock level setting step S3). Further, the supply of a clock signal of a predetermined operating frequency assigned to a clock level 3 to the CPU 46 is started under the control of the operating frequency control circuit 49.

Likely, at time t3 during the execution of the processing A, as a result of acquiring the utilization plural times in a row (utilization acquiring step S1), the operating frequency setting unit 54 determines that the utilization not lower than a predetermined threshold value is acquired three times in a row (successive acquisition determination step S2) and thus increases a clock level by one so as to set the clock level to 4 (clock level setting step S3). Further, the supply of a clock signal of a predetermined operating frequency assigned to a clock level 4 to the CPU 46 is started under the control of the operating frequency control circuit 49.

Furthermore, at time t4 and time t5, the utilization not lower than a predetermined threshold value is similarly acquired three times in a row and thus, the operating frequency setting unit 54 increases a clock level by one in succession to set a clock level 5 and a clock level 6. Further, clock signals of a predetermined operating frequency assigned to clock levels 5 and 6 are successively supplied to the CPU 46 under the control of the operating frequency control circuit 49.

At time t6, the operating frequency setting unit 54 determines that the execution of the processing A is completed (termination determination step S15 in FIG. 6) and thus executes predetermined processing to lower a clock level by one to thereby decrease the clock level to 5 (clock level lowering step S16).

At each of time t7, time t8, time t9, and time t10, the operating frequency setting unit 54 determines that the utilization not higher than a predetermined threshold value is acquired (successive acquisition determination step S2) and thus decreases a clock level by one to set a clock level 4, a clock level 3, a clock level 2, and a clock level 1 in succession (clock level setting step S3). Further, clock signals of a predetermined operating frequency assigned to clock levels 4, 3, 2 and 1 are successively supplied to the CPU 46 under the control of the operating frequency control circuit 49. The above is all for the reference to the graph of FIG. 7A, which shows how a clock level is shifted.

Referring to FIG. 7B, it will be described how a clock level is shifted if the processing B occurs in the processing occurrence step S11 in the operating frequency setting processing in FIG. 6. A state in a period from time "0" to processing start time (time t11) in FIG. 7B is similar to a state in which a clock level is shifted in the event of the processing A as shown in FIG. 7A, and the state is thus not described.

At time t11 (processing start time) in FIG. 7B, the operating frequency setting unit 54 determines that the processing B occurs (processing determination step S12 in FIG. 6) and thus increases an operating frequency up to a high operating frequency (high clock level). In FIG. 7B, the operating frequency setting unit 54 sets the operating frequency to a clock level 6 corresponding to the maximum operating frequency value (high clock level setting step S13). Further, the supply of a clock signal having a predetermined operating frequency assigned to a clock level 6 to the CPU 46 is started under the control of the operating frequency control circuit 49.

Likely, from time t11 forward during the execution of the processing B, as a result of acquiring the utilization of the CPU 46 plural times in a row (utilization acquiring step S1 in FIG. 5), the operating frequency setting unit 54 determines that the utilization not higher than a predetermined threshold value is not acquired (successive acquisition determination step S2), and thus a clock level at 6 is kept instead of lowering the clock level.

At time t12, the operating frequency setting unit 54 determines that the execution of the processing B is completed (termination determination step S15 in FIG. 6), and thus, executes predetermined processing to lower a clock level by one to reduce the clock level to 5 (clock level lowering step S16).

At each of time t13, time t14, time t15 and time t16, the operating frequency setting unit 54 determines that the utilization not higher than a threshold value is acquired (successive acquisition determination step S2), and thus, the clock level is reduced by one to set a clock level 4, a clock level 3, a clock level 2 and a clock level 1 in succession (clock level setting step S3). Further, clock signals having a predetermined operating frequency assigned to a clock level 4, a clock level 3, a clock level 2 and a clock level 1 are successively supplied to the CPU 46 under the control of the operating frequency control circuit 49. The above is all for the reference to the graph of FIG. 7B, which shows how a clock level is shifted.

When the processing not accompanying the event of key input in FIG. 7A (processing A) occurs, the utilization of the CPU 46 is monitored and a clock level (operating frequency) is changed stepwise, making it possible to prevent an operating frequency from increasing along with temporal increasing in the utilization. This realizes the operating frequency setting processing that can suppress an increase in power consumption along with an unintended increase in the operating frequency of the CPU 46. The operating frequency setting processing that changes a clock level stepwise is effective in that a power can be saved in the processing that does not require high responsiveness or throughput, in particular, the processing for receiving a voice/video phone call, the processing for receiving an e-mail, and the processing that causes an alarm to sound at the preset time as a processing not accompanying the event of key input.

On the other hand, when the processing accompanying the event of key input as shown in FIG. 7B occurs, a clock level is increased up to a high clock level at once to thereby enable operating frequency setting processing oriented toward increasing responsiveness or throughput of the CPU 46.

If any processing occurs when a low clock level is set and throughput of the CPU 46 is lowered, the operating frequency setting processing that increases an operating frequency stepwise requires a certain amount of time to set a high clock level. In this case, a user is not satisfied with responsiveness particularly in the event of the processing accompanying user's key input. For example, In consideration of pressing the operation key 14 to trigger any event by a user, the user expects that the processing accompanying the key press is executed instantly. However, if a low clock level is set when the operation key 14 is pressed, the CPU 46 takes some time to shift to a high clock level enough to achieve sufficient throughput, which makes the user disappointed with responsiveness and operability.

For example, if the processing A is started under the condition that a clock level of FIG. 7A is set to 1 (time t1), the clock level is set to 2. However, the CPU 46 operates at a low operating frequency and its responsiveness is not enough just after the processing occurred. In other words, the operating frequency setting processing that increases an operating frequency stepwise can save a power as appropriate, but in the case where processing occurs when a low clock level is set, the operating frequency setting processing is inferior in responsiveness just after the start of the processing.

In contrast, as shown in FIG. 7B, as for the processing B accompanying the event of key input, which requires high responsiveness, an operating frequency is set to a clock level assigned with the maximum operating frequency value at the start of the processing B (time t11) and thus, responsiveness enough for the processing B can be achieved.

Further, high throughput for shortening a processing time as well as high responsiveness is important for the processing accompanying the event of key input. On this point as well, the operating frequency setting processing as shown in FIG. 7B can execute processing accompanying the event of key input at a high operating frequency and thus can reduce the total processing time.

For example, in FIG. 7A, the requisite processing time of the processing A is $\Delta ta$. In contrast, in FIG. 7B, the requisite processing time of the processing B is $\Delta tb$, and the total processing time can be shortened by $\Delta t$.

Referring next to a graph, a description will be given to a way how a clock level is shifted in the case where the processing not accompanying the event of key input (processing A) and the processing accompanying the event of key input (processing B) unsuccessively or successively occur.

In the following processing for setting an operating frequency of the CPU 46, it is assumed that the operating frequency control circuit 49 can control an operating frequency at 8 clock levels by way of example.

In the followings, description will be made in the assumption that operating frequency setting processing that changes a clock level stepwise (hereinafter refereed to as "stepwise operating frequency setting processing") is carried out during the execution of the processing A, and operating frequency setting processing that increases an operating frequency to a high clock level instantly just after the start of processing (hereinafter refereed to as "high clock operating frequency setting processing") is carried out during the execution of the processing B.

Further, as a comparative example to the operating frequency setting processing of this embodiment, the case of performing stepwise operating frequency setting processing upon the execution of both of the processing A and the processing B is also described.

Figure 8A:
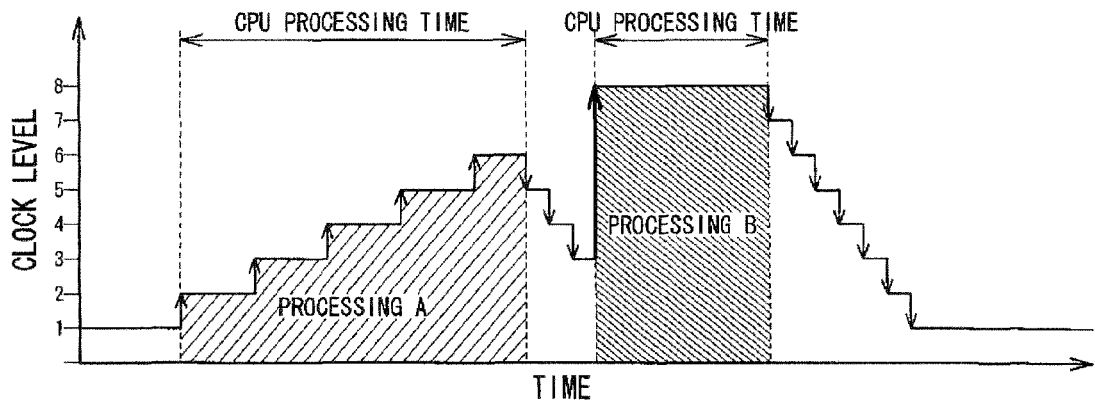
Figure 8B:
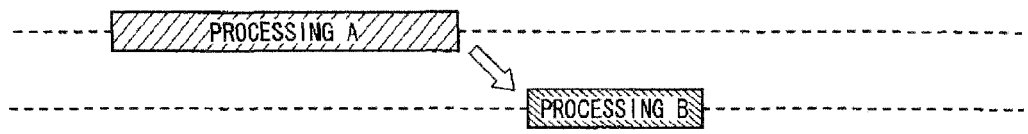
Figure 8C:
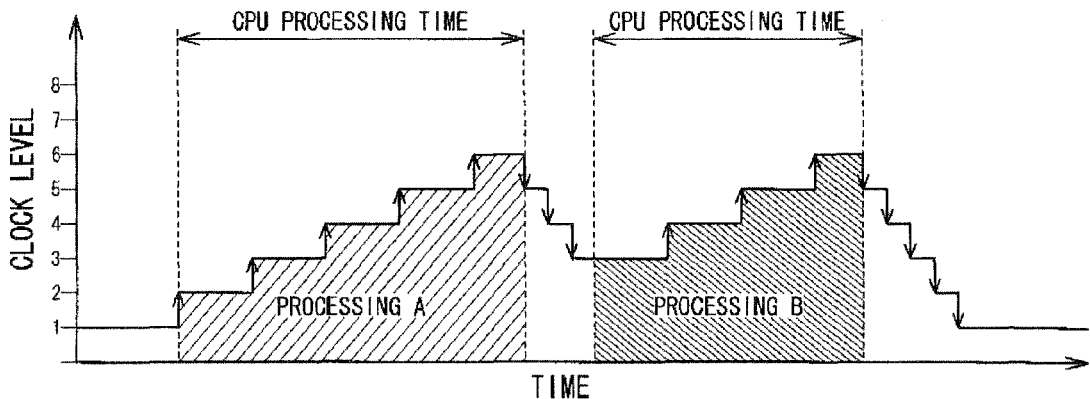
Figure 8D:
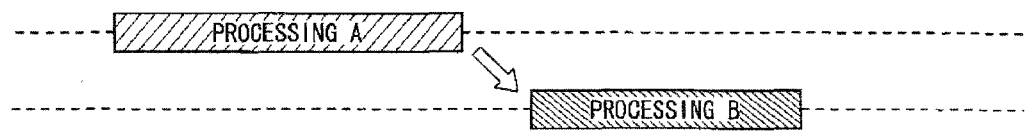

FIGS. 8A to 8D illustrate the case of performing operating frequency setting processing in the processing A and the processing B that are unsuccessively executed. FIG. 8A is a graph showing a way how a clock level is shifted. FIG. 8B shows a relationship between an execution time of the processing A and an execution time of the processing B in the case where the operating frequency setting processing of FIG. 8A is carried out. FIG. 8C is a graph showing a way how a clock level is shifted in the case where operating frequency setting processing is carried out, as a comparative example to the operating frequency setting processing of FIG. 8A. FIG. 8D shows a relationship between an execution time of the processing A and an execution time of the processing B in the case where the operating frequency setting processing of FIG. 8C is carried out.

FIGS. 8A and 8C show a way how a clock level is shifted in the case where the processing 1 occurs after the elapse of a predetermined time from the completion of the processing A as shown in FIGS. 8B and 8D. At the start of the processing A, the stepwise operating frequency setting processing is executed in both of the illustrated examples of FIGS. 8A and 8C. Upon the completion of the processing A, a clock level is raised up to 6 but is lowered stepwise down to 3 along with the reduction in the utilization of the CPU 46. At this time, the processing B is started. At the start of the processing B in FIG. 8C after the stepwise operating frequency setting processing, the clock level is set to 3 and thus, sufficient responsiveness cannot be obtained just after the start of the processing B.

However, at the start of the processing B in FIG. 8A after the high clock operating frequency setting processing, a clock level is raised up to a clock level 8 assigned with the maximum operating frequency value and the sufficient responsiveness to user's key input can be realized. In addition, the CPU 46 can operate with high throughput just after the start of the processing. Therefore, as shown in FIG. 8B, the processing execution time can be made shorter than the execution time of the processing B in FIG. 8D.

Figure 9A:
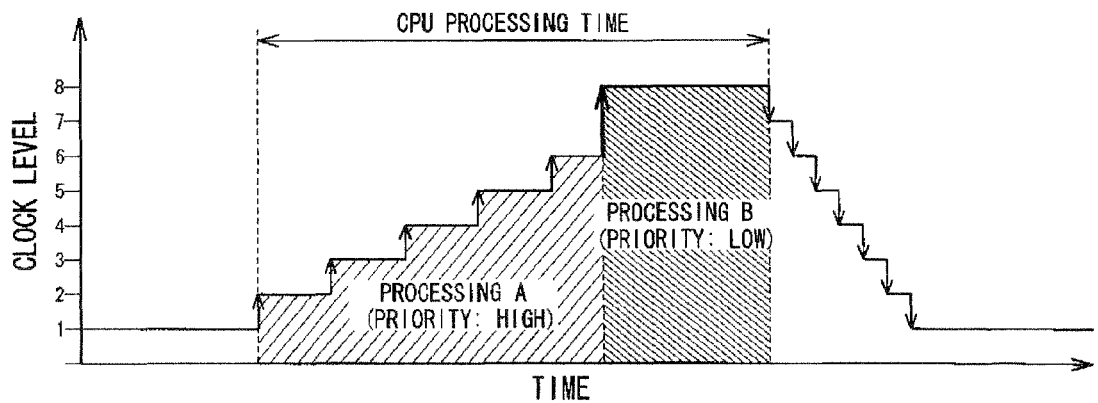
Figure 9B:
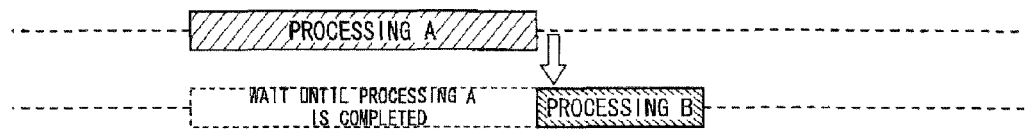
Figure 9C:
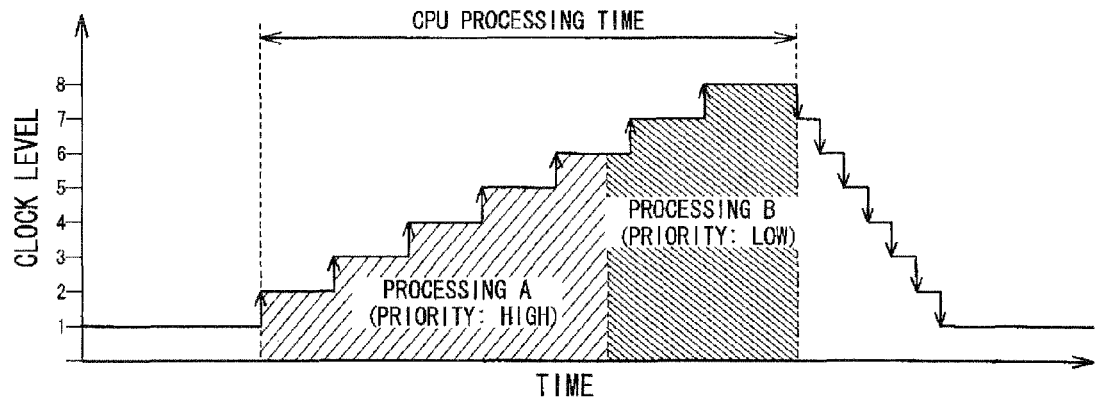
Figure 9D:
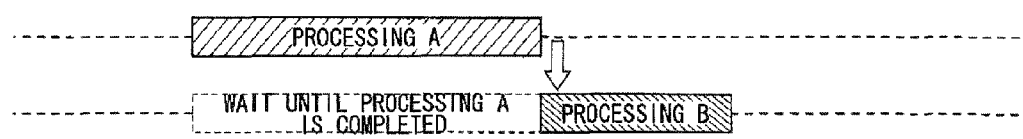

FIGS. 9A to 9D illustrate the case of performing an operating frequency setting processing in the processing A and the processing B that are successively executed. FIG. 9A is a graph showing a way how a clock level is shifted. FIG. 9B shows a relationship between an execution time of the processing A and an execution time of the processing B in the case where the operating frequency setting processing of FIG. 9A is carried out FIG. 9C is a graph showing a way how a clock level is shifted in the case where operating frequency setting processing is carried out, as a comparative example to the operating frequency setting processing of FIG. 9A. FIG. 9D shows a relationship between an execution time of the processing A and an execution time of the processing B in the case where the operating frequency setting processing of FIG. 9C is carried out.

FIGS. 9A and 9C show a way how a clock level is shifted in the case where the processing 13 occurs during the execution of the processing A and the processing A precedes the processing B as shown in FIGS. 9B and 9D. Thus, the processing B is executed following the processing A. Priorities given to the processing are managed by the task management unit 51 that manages tasks (processing) to be executed on the CPU 46.

At the start of the processing A, the stepwise operating frequency setting processing is executed in both of the illustrated examples of FIGS. 9A and 9C. Upon the completion of the processing A, a clock level is raised up to 6. At this time, the processing B is continuously executed. However, at the start of the processing B in FIG. 9C after the stepwise operating frequency setting processing, the clock level is set to 6.

However, at the start of the processing B in FIG. 9A after the high clock operating frequency setting processing, a clock level is instantly raised up to a clock level 8 assigned with the maximum operating frequency value and sufficient responsiveness to user's key input can be realized as compared with that just after the start of the processing B in FIG. 9C.

Figure 10A:
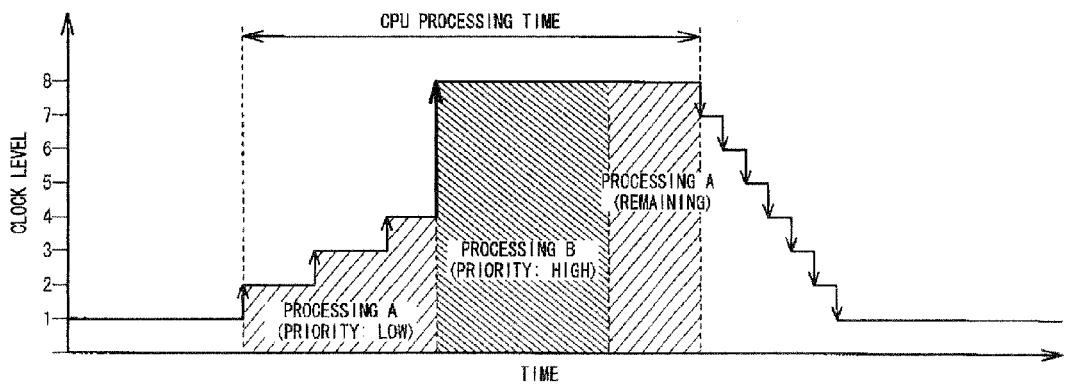
Figure 10B:
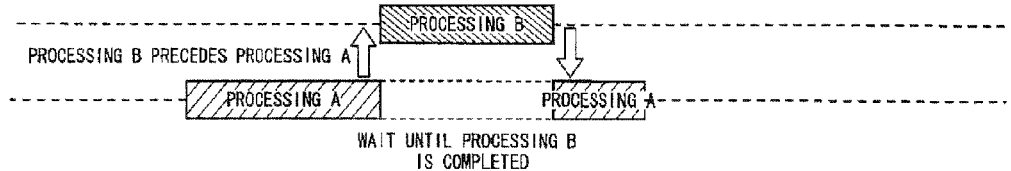
Figure 10C:
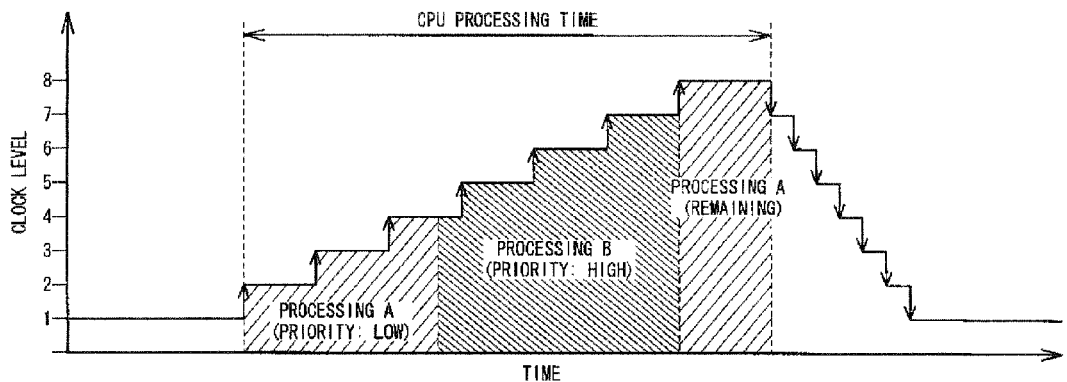
Figure 10D:
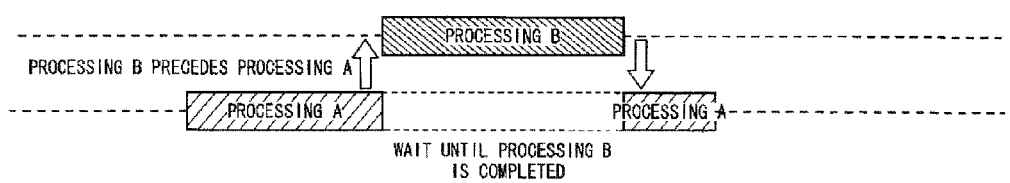

FIGS. 10A to 10D illustrate another case of performing operating frequency setting processing in the processing A and the processing B that are successively executed. FIG. 10A is a graph showing a way how a clock level is shifted. FIG. 10B shows a relationship between an execution time of the processing A and an execution time of the processing B in the case where the operating frequency setting processing of FIG. 10A is carried out. FIG. 10C is a graph showing a way how a clock level is shifted in the case where operating frequency setting processing is carried out, as a comparative example to the operating frequency setting processing of FIG. 10A. FIG. 10D shows a relationship between an execution time of the processing A and an execution time of the processing B in the case where the operating frequency setting processing of FIG. 10C is carried out.

FIGS. 10A and 10C show a way how a clock level is shifted in the case where the processing B occurs during the execution of the processing A and the processing B precedes the processing A as shown in FIGS. 10B and 10D. Thus, the processing B interrupts the processing A and is executed. After the completion of the processing B, the processing A is executed from where the interrupt occurred.

At the start of the processing A, the stepwise operating frequency setting processing is executed in both of the illustrated examples of FIGS. 10A and 10C. Prior to the interrupt of the processing B during the execution of the processing A, a clock level is raised up to 4. At this time, at the start of the processing B in FIG. 10C after the stepwise operating frequency setting processing, the clock level is kept at 4. During the execution of the processing B, the clock level is increased stepwise in accordance with the utilization of the CPU 46.

However, at the start of the processing B in FIG. 10A after the high clock operating frequency setting processing, a clock level is instantly raised up to a clock level 8 assigned with the maximum operating frequency value and the sufficient responsiveness to user's key input can be realized as compared with that just after the start of the processing B in FIG. 10C. In addition, as shown in FIG. 10B, the total processing execution time can be made shorter than the execution time of the processing B in FIG. 10D.

If the processing B occurs during the execution of the processing A and the same priority level is given to the processing A and the processing B, the processing B accompanying the user's key input may be executed first. At this time, at the start of the processing B, high clock operating frequency setting processing is carried out. Alternatively, an effect of increasing the responsiveness and throughput can be achieved such that in the event of the processing B, only the high clock operating frequency setting processing may be carried out so as to terminate the processing A and then start execution of the processing B.

According to the cellular phone 1 of this embodiment, the responsiveness and throughput can be increased while suppressing power consumption in accordance with a type of triggered processing by determining the type of the triggered processing and controlling an operating frequency as appropriate. This cellular phone is advantageous in that a response to a user who made key input can be accelerated. In particular, higher responsiveness and throughput than those in the stepwise operating frequency setting processing can be obtained upon the execution of the processing accompanying the event of key input in the case of operating the CPU at a low operating frequency to save a power (for example, during the execution of a sleep task).

In this embodiment, although the operating frequency of the CPU 46 is set to realize the high responsiveness and throughput of the CPU 46, an operating voltage may be appropriately controlled together with the operating frequency or in place of the operating frequency.

Second Embodiment

A second embodiment of a portable terminal device according to the present invention will be described hereunder with reference to the accompanying drawings.

A clamshell cellular phone of this second embodiment as an example of the portable terminal device according to the present invention differs from the cellular phone of the first embodiment in that the second embodiment is provided with a magnetic sensor for detecting an opened/closed state of the cellular phone, a memory card slot, and an external connecting terminal. Like reference numerals are added to the same components and portions as those of the first embodiment, and repeated description is omitted herein.

FIGS. 11A and 11B show an external configuration of a cellular phone devised as the second embodiment of a portable terminal device according to the present invention. FIG. 11A is a front view showing the external configuration of a cellular phone 1a that is opened at about 180 degrees. FIG. 11B shows the external configuration of the opened cellular phone 1a as viewed from the left side.

On the other hand, in the illustrated examples of FIGS. 12A and 12B, the opened cellular phone 1a in FIGS. 11A and 11B is turned in the direction of the arrow X so as to be closed. FIG. 12A shows the external configuration of the closed cellular phone 1a as viewed from the front, and FIG. 12B shows the external-configuration of the closed cellular phone 1a as viewed from the left side.

Magnetic sensors 61a, 61b, 61c and 61d (magnetic sensors 61) are provided at predetermined positions in the first casing 12a and the second casing 13a of the cellular phone 1a so as to detect states of the casings 12a and 13a of the cellular phone 1a.

Further, as shown in FIGS. 11B and 12B, a memory card slot 62 and an external connecting terminal 63 are provided on the left side of the first casing 12a. The memory card slot 62 includes a slot to which a memory card is insertable. The memory card is a kind of flash memory card typified by a NAND type flash memory card or a NOR type flash memory card. Various kinds of data such as images, sounds or music can be written to or read from the memory card through a 10-pin terminal. The external connecting terminal 63 is connected to various external devices such as a battery charge cable used for charging a battery 43 or a USB cable used for connecting a personal computer to the cellular phone 1a.

Figure 13:
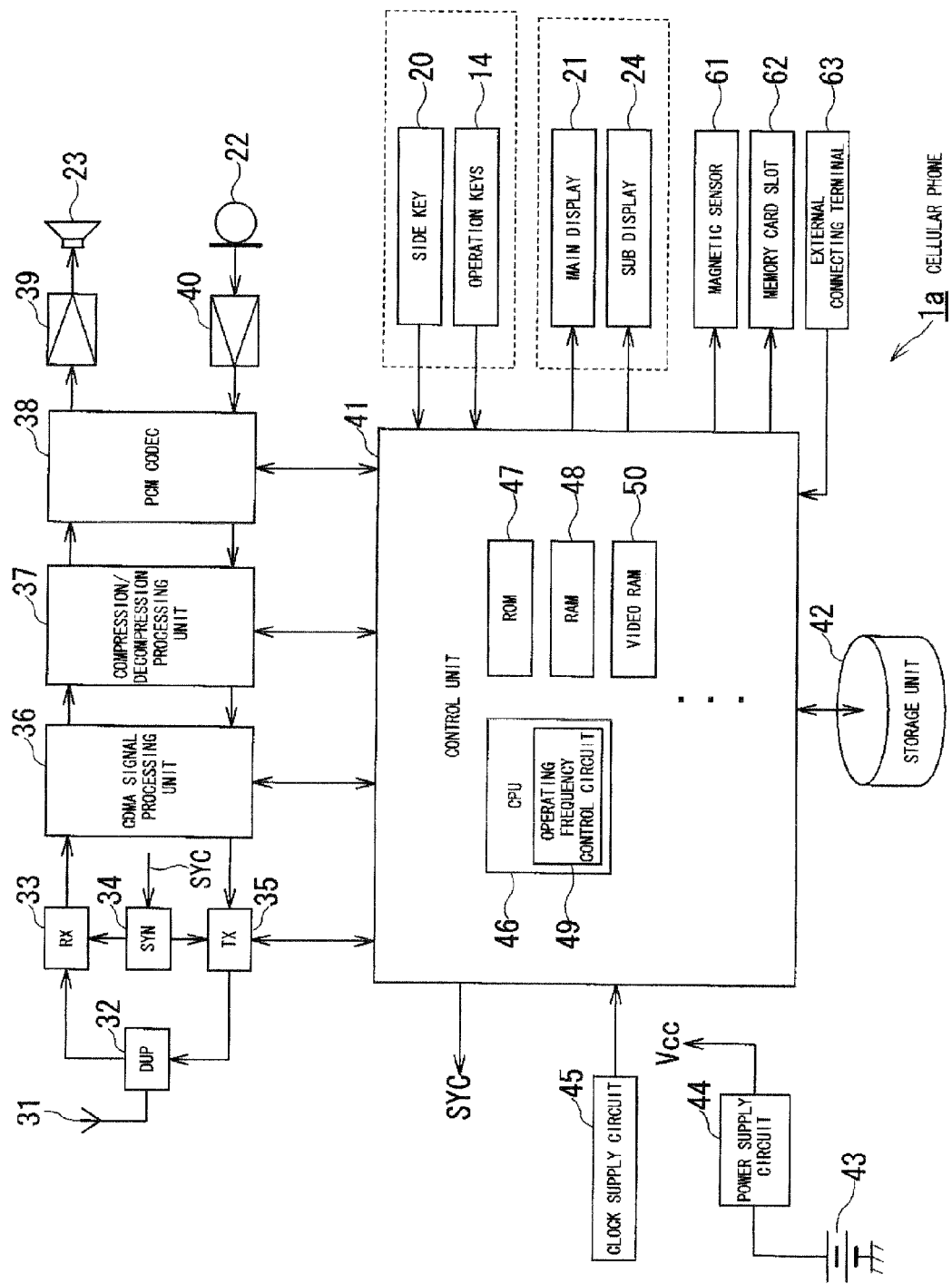
FIG. 13 shows an internal arrangement of the cellular phone of the second embodiment.

FIG. 13 shows an internal arrangement of the cellular phone 1a of the second embodiment, which differs from that of the cellular phone 1 of the first embodiment in that the second embodiment is provided with the magnetic sensors 61, the memory card slot 62 and the external connecting terminal 63.

Figure 14:
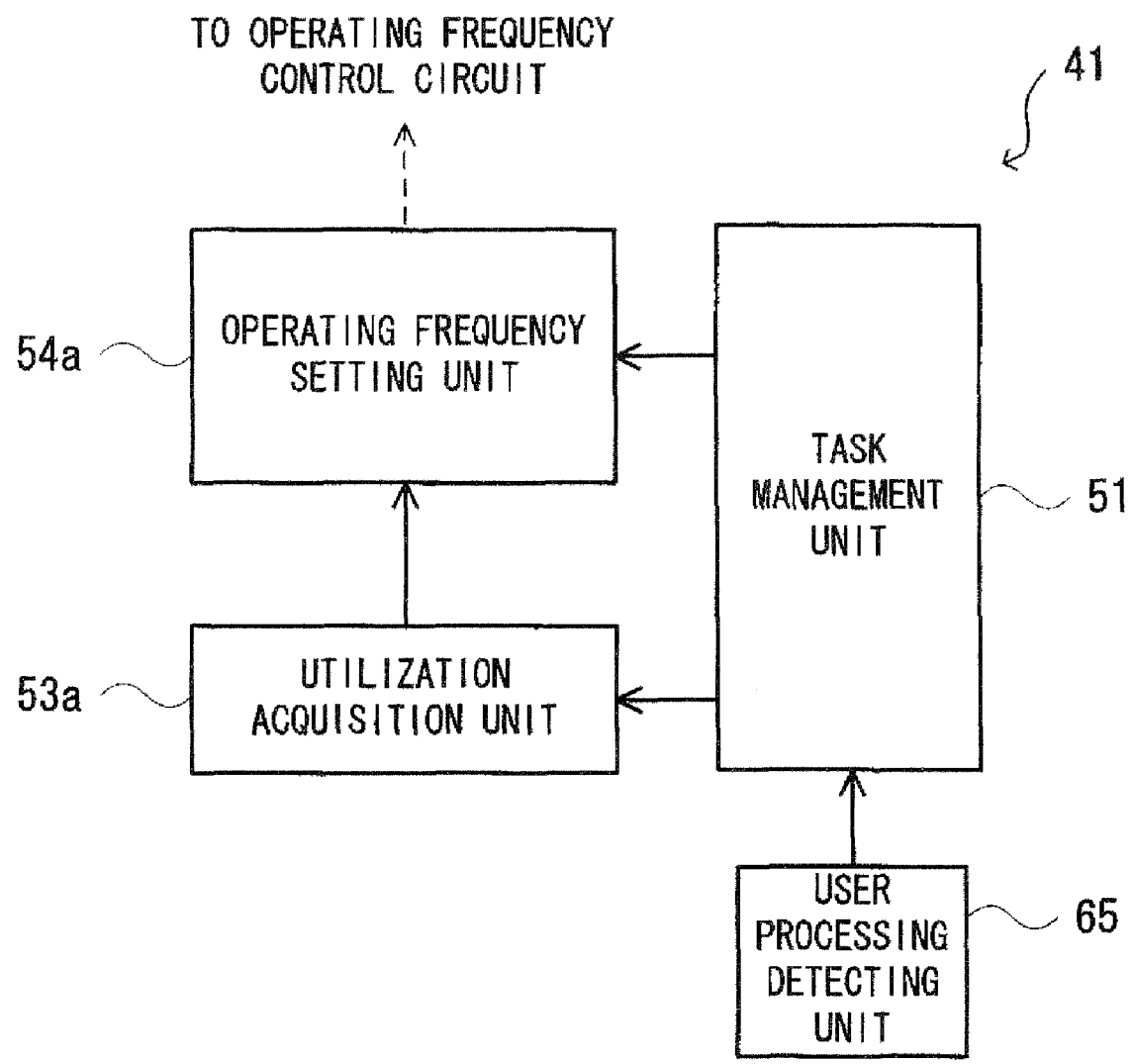
FIG. 14 is a schematic functional block diagram of a control unit of the cellular phone according to the second embodiment.

FIG. 14 is a schematic functional block diagram of the control Unit 41 of the cellular phone 1a according to the second embodiment. Tasks managed with the task management unit 51 are roughly divided into a group of processing accompanying the user event and a group of processing not accompanying the user event. The processing accompanying the user event corresponds to the processing that occurs in the case where the cellular phone 1a is changed in a state between the closed state and the opened state, in the case where various external devices such as a USB cable are inserted to the external connecting terminal 63, in the case where the operation key 14 or the side key 20 is pressed. Here, the user event means the processing applied from the outside of the cellular phone 1a, and more specifically, the processing that can be considered to occur due to a user's intended operation to the cellular phone 1a. The user event is not limited to the above examples.

The processing not accompanying the user event corresponds to every processing triggered by any other factor than the user event. Examples thereof include a processing for receiving a voice/video phone call, a processing for receiving an e-mail and a processing that causes an alarm to sound at the preset time.

The task management unit 51 manages a sleep task that is the lowest-priority special one, as a task ready to execute all the time. A state in which the sleep task is executed refers to a sleep state where no other tasks are being executed or ready to execute.

In this second embodiment, a state in which the sleep task is executed on the CPU 46 is referred to as "CPU is sleep". Further, a state in which any task other than the sleep task is executed on the CPU 46 is referred to as "CPU is busy".

A user event detecting unit 65 detects a user event applied to the cellular phone 1a by a user. In the case where the cellular phone 1a is changed in a state between a closed state and an opened state, the magnetic sensors 61 function as the user event detecting unit 65. If the user event is detected, the user event detecting unit 65 notifies the task management unit 51 of the user event. Further, the task management unit 51 manages the processing accompanying the user event as a task.

A utilization acquisition unit 53a acquires the utilization of the CPU 46 and supplies information about the utilization to the operating frequency setting unit 54. The utilization acquisition unit 53a references a currently-executed task managed in the task management unit 51 to obtain an operating state indicating whether the CPU 46 is sleep or busy, for example. Here, the utilization acquisition unit 53a acquires the operating state at regular time intervals (for example, every 5 msec).

The utilization acquisition unit 53a saves a predetermined number of loaded data about the operating state corresponding to a predetermined number of times (for example, 128 times) as an operating state history on a time-series basis. The utilization acquisition unit 53a appropriately updates the operating state history to delete the oldest operating state if the latest operating state is obtained. In addition, the utilization acquisition unit 53a derives the utilization of the CPU 46 from a ratio of operating states as a busy state in the operating state history being saved. In other words, "CPU utilization" can be derived from the number of busy states detected per unit time. An operation of loading one latest operating state and deleting the oldest operating state is repeated with time in the operating state history saved in the utilization acquisition unit 53a. Thus, the utilization of the CPU 46 is also changed stepwise (continuously) with time.

Further, if the processing accompanying the user event occurs, the utilization acquisition unit 53a rewrites all operating states in the current operating state history to busy states.

The operating frequency setting unit 54a receives the utilization from the utilization acquisition unit 53a to increase or decrease an operating frequency in accordance with change in utilization. The utilization of the CPU 46 is changed stepwise with time and thus, an operating clock level set by the operating frequency setting unit 54a is accordingly changed stepwise (continuously). If the utilization is changed from a predetermined value to another predetermined values the operating frequency setting unit 54a decreases or increases a clock level, for example.

One example of the processing for setting an operating frequency of the CPU 46 in the cellular phone 1a of this embodiment will be described hereunder.

Figure 15:
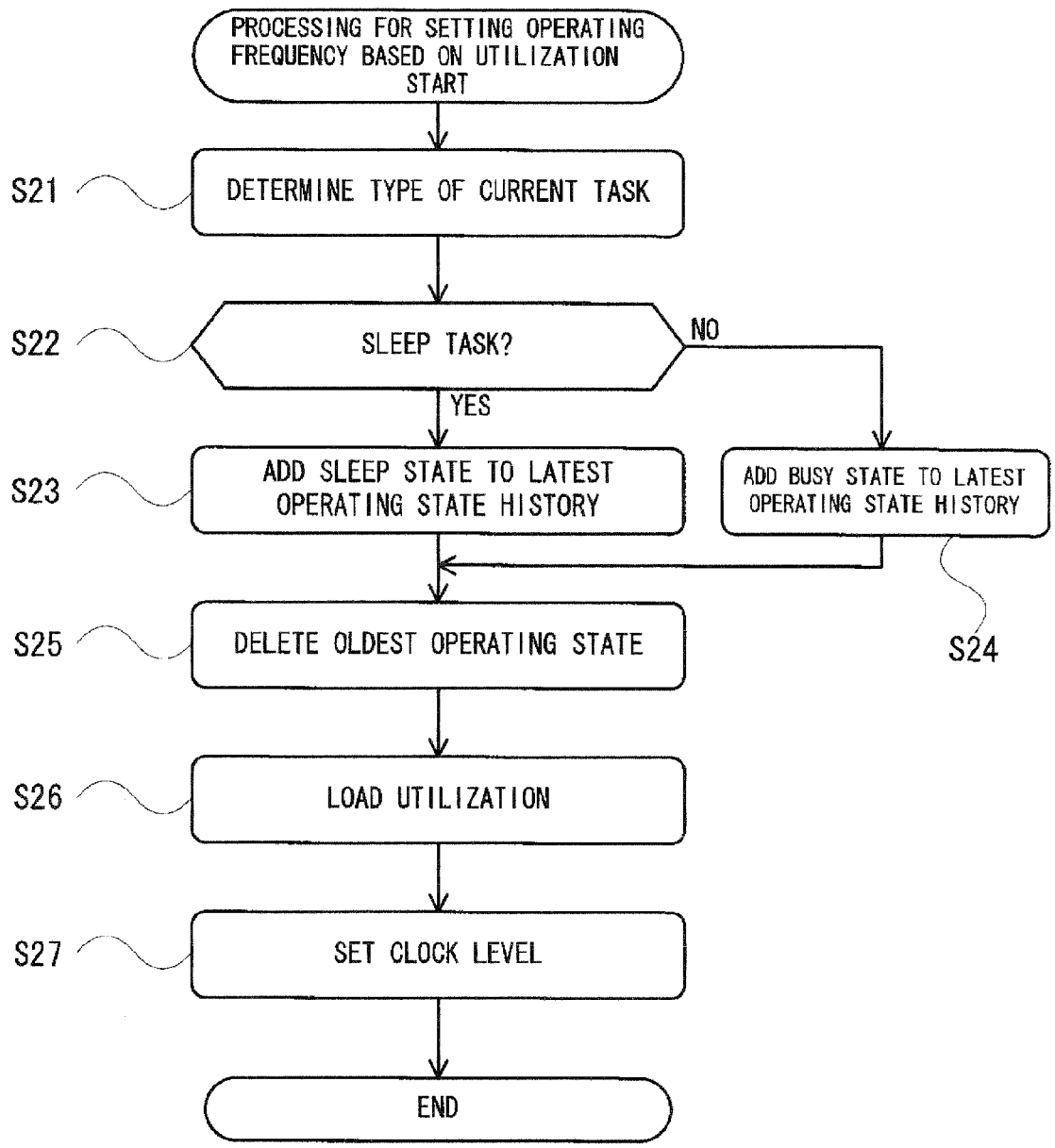
FIG. 15 is a flowchart representing an example of processing for setting a CPU operating frequency based on CPU utilization, which is executed by an operating frequency setting unit of the cellular phone of the second embodiment.

FIG. 15 is a flowchart representing an example of the processing for setting a CPU operating frequency based on the utilization of the CPU 46 which is executed by the operating frequency setting unit 54a of the cellular phone 1a of the second embodiment.

In step S21, the utilization acquisition unit 53a loads data about a type of a currently-executed task from the task management unit 51, in other words, data representing which of a sleep task and any other task is executed.

In step S22, the utilization acquisition unit 53a determines whether the task being executed on the CPU 46 is a sleep task. If determining that the currently-executed task is a sleep task, the utilization acquisition unit 53a adds a sleep state to the latest operating state history in step S23. On the other hand, if determining that the currently-executed task is a task other than the sleep task, the utilization acquisition unit 53a adds a busy state to the latest operating state history in step S24.

In step S25, the utilization acquisition unit 53a adds the latest operating state to the operating state history in the operating state adding steps S23 and S24 as well as deletes the oldest operating state.

In step S26, the utilization acquisition unit 53a refers to the operating state history being saved to acquire the utilization of the CPU 46. The utilization of the CPU 46 is derived from the number of busy states in the operating state history.

In step S27, the operating frequency setting unit 54a sets clock levels each assigned with a predetermined operating frequency value based on the acquired utilization of the CPU 46 to complete the operating frequency setting processing.

FIG. 16 is a conceptual view illustrating an example of clock level setting processing executed by the operating frequency setting unit 54a. In FIG. 16, the symbol "○" indicates that an operating state of the CPU 46, which was acquired with the utilization acquisition unit 53a, is a sleep state, and the symbol "●" indicates that an operating state of the CPU 46 is a busy state. In addition, in this example, the utilization acquisition unit 53a loads one operating state to update the operating state history at regular time intervals during a period from time t1 to time t17. Further, in the operating state history, the oldest one comes in the leftmost position and the newest one comes in the rightmost position. For easiness of explanation, in this example, a history of the last 8 states is stored. In FIG. 16, clock levels 1 to 5 are used.

In an example of a way how an operating state history is changed in FIG. 16, it is assumed that at time t1 (processing start time) in FIG. 16, the CPU 46 is executing a sleep task and all operating states in the history are sleep states, and at time to, any task other than the sleep task is started, and then, at time t10, the executed task is completed.

At time t1, since the CPU 46 is executing a sleep task, a sleep state is added to an operating frequency setting unit state history. At this time, the oldest operating state (not shown) is deleted. The utilization acquisition unit 53a determines that the utilization of the CPU 46, that is, the number of busy states in the operating state history is 0/8 at the time t1. In this case, the operating frequency setting unit 54a sets a clock level to 1.

At time t2, since the CPU 46 is executing any task other than the sleep task, a busy state is added to the operating state history. At this time, the oldest operating state at the time t1 is deleted. Further, the utilization acquisition unit 53a determines that the utilization of the CPU 46 is 1/8 at the time t2. Since the utilization is changed from 0/8 to 1/8, the operating frequency setting unit 54a changes a clock level from 1 to 2.

At time t3, a busy state is added to the operating state history. Further, the utilization acquisition unit 53a determines that the utilization of the CPU 46 is 2/8 at the time t3. The operating frequency setting unit 54a sets a clock level to 2 at this time.

At time t4, a busy state is added to the operating state history. Further, the utilization acquisition unit 53a determines that the utilization of the CPU 46 is 3/8 at the time t4. The operating frequency setting unit 54a changes a clock level from 2 to 3.

At time t5 to time t8, a busy state is added in succession to the operating state history, and at time t9, all operating states in the history become busy states. At this time, the utilization acquisition unit 53a determines that the utilization of the CPU 46 is 8/8. The operating frequency setting unit 54a sets a clock level at this time to a clock level 5 assigned with the maximum operating frequency value.

At time t10, the CPU 46 completes the executed task and thus starts a sleep task. Along with this operation, a sleep state is added to the operating state history. At this time, the utilization acquisition unit 53a determines that the utilization of the CPU 46 at the time t10 is 7/8. Further, the operating frequency setting unit 54a keeps a clock level at 5 instead of changing the clock level.

Here, variations in the utilization can be suppressed by applying hysteresis such that a clock level is changed at different timings in the case where the utilization of the CPU 46 is increasing (time t1 to time t9) and in the case where the utilization of the CPU 46 is decreasing (time t9 to time t17).

From the time t11 forward, a clock level is set in accordance with the utilization similar to the above example where the utilization is increasing (time t1 to time t9) to execute control on the operating frequency of the CPU 46 in a stepwise manner.

Hereunder, an example of operating frequency setting processing executed when the user event occurs in the cellular phone 1a of this second embodiment will be described.

Figure 17:
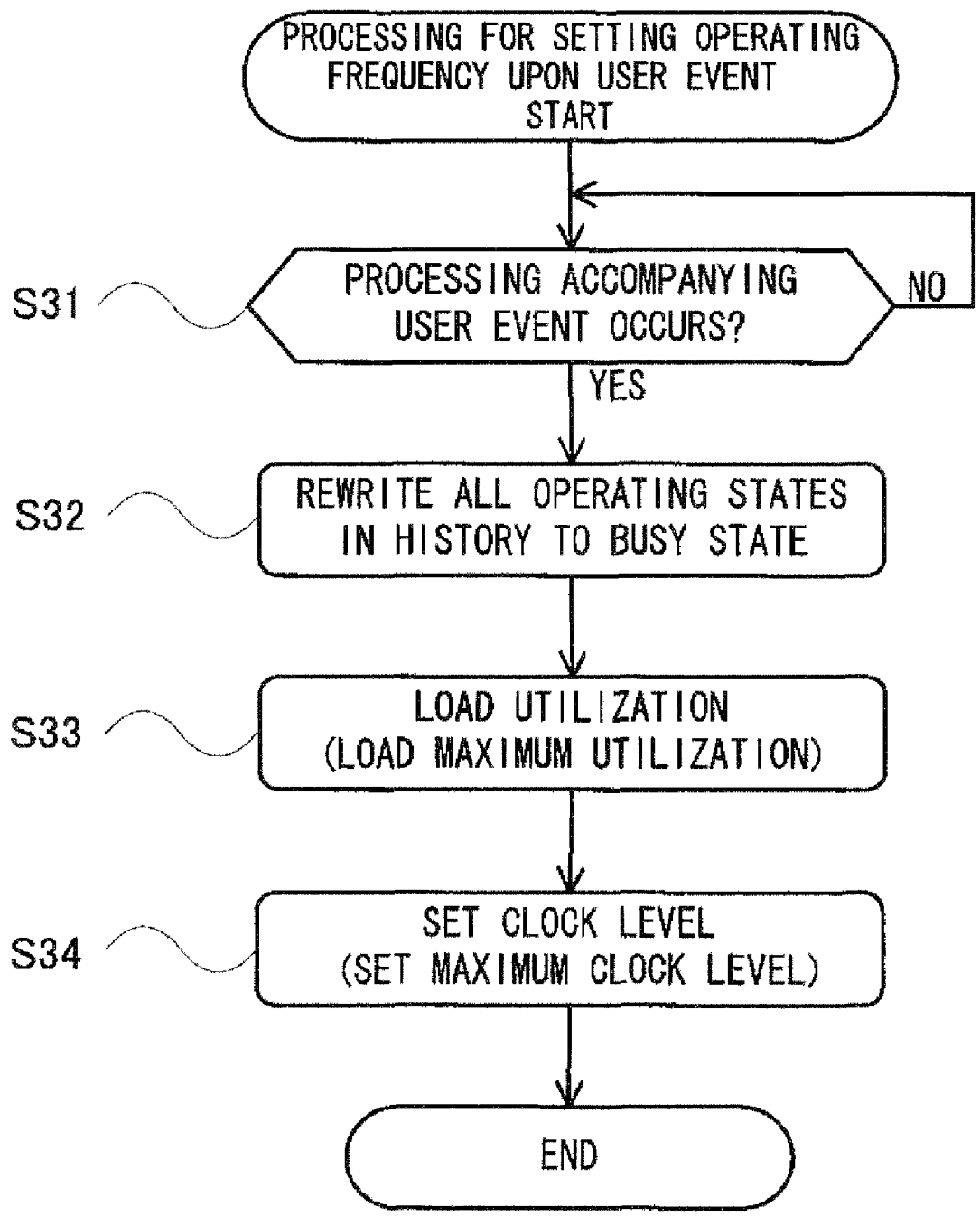
FIG. 17 is a flowchart representing an example of operating frequency setting processing executed by the operating frequency setting unit of the cellular phone of the second embodiment when the user event occurs.

FIG. 17 is a flowchart representing an example of an operating frequency setting processing executed by the operating frequency setting unit 54*a* of the cellular phone 1*a* of the second embodiment when the user event occurs.

In step S31, the utilization acquisition unit 53*a* determines whether the processing accompanying the user event occurs along with the user event. Here, the processing accompanying the user event corresponds to processing that occurs in the case where the cellular phone 1*a* is changed in a state between a closed state and an opened state, in the case where various external devices such as a USB cable are inserted to the external connecting terminal 63, in the case where the operation key 14 or the side key 20 is pressed. The processing not accompanying the user event corresponds to every processing triggered by any other factor than the user event. Examples thereof include a processing for receiving a voice/video phone call, a processing for receiving an e-mail and a processing that causes an alarm to sound at the preset time.

If the utilization acquisition unit 53*a* determines that the processing did not accompany the user event, the unit waits until the processing accompanying the user event occurs. During this operation, the processing for setting an operating frequency based on utilization in FIG. 15 is repeatedly executed.

If determining that the processing accompanying the user event occurred, in step S32, the utilization acquisition unit 53*a* rewrites all operating states in the current operating state history to busy states. Further, in step S33, the utilization acquisition unit 53*a* determines the utilization based on the operating state history to notify the operating frequency setting unit 54*a* of the utilization. The utilization obtained in the utilization acquisition step S33 is the maximum value since all operating states of the history are busy states, and the value is notified to the operating frequency setting unit 54*a*.

In step S34, the operating frequency setting unit 54*a* sets a clock level assigned with the maximum operating frequency value based on the obtained utilization of the CPU 46 as the maximum value to complete the operating frequency setting processing. If the processing accompanying the user event occurs, the operating frequency setting unit 54*a* instantly raises an operating frequency to a clock level assigned with the maximum operating frequency value irrespective of the clock level or the operating state history. After the clock level is raised, as illustrated in FIG. 15, the utilization acquisition unit 53*a* updates the operating state history at regular time intervals and the utilization of the CPU 46 is loaded in accordance with the operating state of the CPU 46. The operating frequency setting unit 54*a* sets a clock level based on the utilization.

According to the cellular phone 1*a*, in addition to the beneficial effects described in the first embodiment, it is possible to detect every processing intended by a user and increase responsiveness and throughput to the processing to thereby increase user operability of the entire cellular phone 1*a*.

It is further to be noted that, in the above description, although the portable terminal device of the present invention is applied to the clamshell cellular phone, the present invention is not limited thereto and is applicable to a slidable cellular phone. In this case, the user processing detecting unit 65 detects an operation of closing/opening the cellular phone by sliding the phone, as the user event.

Furthermore, in the first and second embodiments, although the utilization of the CPU 46 is acquired and a clock level is set in different ways, similar effects can be achieved by combining these in appropriate.

Still furthermore, the present invention is applicable to a PDA, a personal computer, a portable game machine, a portable music player, a portable video player, and other such portable terminal devices in addition to the cellular phone mentioned herein.

Moreover, a series of processing described in each embodiment of the present invention can be executed using hardware as well as software.

What is claimed is:

1. A portable terminal device comprising:
a CPU;
a supplying unit configured to supply, to the CPU, an operating frequency of a clock signal used to operate the CPU;
a setting unit configured to set one clock level out of a plurality of clock levels assigned with the operating frequency in accordance with an operating state of the CPU and to change the operating frequency stepwise at the clock levels to set the clock level of the operating frequency;
a control unit configured to control the operating frequency supplied to the CPU at the clock levels based on the setting made by the setting unit; and
an input accepting unit configured to accept any key input including key event which is irrelevant to an input of a command regarding the operating frequency of the CPU;
wherein the setting unit determines whether a processing accompanying key event is generated and, when the setting unit determines that the processing accompanying key event is generated, the setting unit sets the clock level to a predetermined level irrespective of the operating state of the CPU.

2. The portable terminal device according to claim 1, wherein if the input accepting unit accepts the key input, the setting unit sets the clock level to the clock level assigned with the maximum value of the operating frequency.

3. The portable terminal device according to claim 1, further comprising a utilization acquisition unit configured to acquire utilization of the CPU indicating an operating state of the CPU, wherein the setting unit increases or decreases the clock level stepwise along with an increase or decrease of the utilization.

4. A portable terminal device comprising:
a CPU;
a supplying unit configured to supply, to the CPU, an operating frequency of a clock signal used to operate the CPU;
a setting unit configured to set one cock level out of a plurality of clock levels assigned with the operating frequency in accordance with an operating state of the CPU and change the operating frequency stepwise at the clock levels to set the clock level of the operating frequency;
a control unit configured to control the operating frequency supplied to the CPU at the clock levels based on the setting made by the setting unit; and
a detecting unit configured to detect a processing that is performed when a user performs an operation on the portable terminal device, the operation being irrelevant to an input of a command regarding the operating frequency of the CPU,
wherein when the detecting unit detects the processing, the setting unit sets the clock level to a predetermined level irrespective of the operating state of the CPU.

5. The portable terminal device according to claim 4, wherein if the detecting unit detects the processing, the setting unit sets the clock level to the clock level assigned with the maximum value of the operating frequency.

6. The portable terminal device according to claim 4, wherein the predetermined processing executed by a user includes at least key press, change of a casing, insertion of a cable and insertion of a memory card.

7. The portable terminal device according to claim 4, further comprising a utilization acquisition unit configured to acquire utilization of the CPU indicating an operating state of the CPU, wherein the setting unit increases or decreases the clock level stepwise along with an increase or decrease of the utilization.

* * * * *